United States Patent [19]
Puziol et al.

[11] Patent Number: 5,454,117
[45] Date of Patent: Sep. 26, 1995

[54] CONFIGURABLE BRANCH PREDICTION FOR A PROCESSOR PERFORMING SPECULATIVE EXECUTION

[75] Inventors: David L. Puziol, Sunnyvale; Korbin S. Van Dyke, Fremont; Larry Widigen, Salinas; Len Shar, Menlo Park; Walstein B. Smith, III, San Jose, all of Calif.

[73] Assignee: NexGen, Inc., Milpitas, Calif.

[21] Appl. No.: 112,572

[22] Filed: Aug. 25, 1993

[51] Int. Cl.$^6$ ............................................. G06F 9/38
[52] U.S. Cl. .................. 395/800; 395/375; 364/DIG. 1; 364/261.7; 364/231.8
[58] Field of Search .................. 395/375, 800; 364/DIG. 1, 261.7, 231.8

[56] References Cited

U.S. PATENT DOCUMENTS

| | | | |
|---|---|---|---|
| 5,093,778 | 3/1992 | Favor et al. | 395/375 |
| 5,142,634 | 8/1992 | Fite et al. | 395/375 |
| 5,163,140 | 11/1992 | Stiles et al. | 395/425 |
| 5,226,126 | 7/1993 | McFarland et al. | 395/375 |
| 5,226,130 | 7/1993 | Favor et al. | 395/375 |
| 5,228,131 | 7/1993 | Ueda et al. | 395/375 |
| 5,230,068 | 7/1993 | Van Dyke et al. | 395/375 |
| 5,265,213 | 11/1993 | Weiser et al. | 395/375 |

OTHER PUBLICATIONS

Peter M. Kogge; "The Architecture of Pipelined Computers"; McGraw–Hill; 1981; Section 6.6.2.
J. L. Hennessy and D. A. Patterson; "Computer Architecture, A Quantitiative Approach"; Morgan Kaufmann; 1990; Chapter 6 Section 6.7.
D. R. Ditzel and H. R. McLellan; "Branch folding in the CRISP microprocessor: Reducing the branch delay to zero"; Proceedings of the 14th Symposium on Computer Architecture; Jun. 1987; Pittsburg; pp. 2–7.
J. K. F. Lee and A. J. Smith; "Branch Prediction Strategies and Branch Target Buffer Design"; IEEE Computer; vol. 17; Jan. 1984; pp. 6–22.
Harvey G. Cragon; "Branch Strategy Taxonomy and Performance Models"; IEEE Computer Society Press; 1992; Chapter 4.

(List continued on next page.)

Primary Examiner—Alyssa H. Bowler
Assistant Examiner—Walter D. Davis, Jr.
Attorney, Agent, or Firm—W. Bennett Smith, III

[57] ABSTRACT

In a first aspect of the invention, branch prediction hardware, comprising logic and interconnect, is configurable via a control line to alter the manner in which the branch prediction is generated. The configuration can be done programmatically in software. Or, the configuration can be done by hardware in response to processor events. Such processor events include the loading of the CS register and changes in the instruction workload. In a second aspect of the invention, related to speculative execution, the directions of a plurality of branches are predicted based partly on resolved branch history information. Tentative branch history information is then stored for each of the predicted branches. When a predicted branch is resolved, the resolved branch history information is updated based on the stored tentative branch history information for the branch most recently resolved. Additionally, the predictions may be partly based on preceding unresolved branch predictions if any are outstanding. In a third aspect of the invention, Hit/Miss information from a Branch Prediction Cache (BPC) can optionally be used in formulating the next state value of an addressed two-bit counter stored in a correlation-based branch history table. Since a Miss in the BPC may indicate that this branch has not been encountered recently, whatever state currently exists can be optionally forced to a state that is based solely on whether the branch is resolved taken or not. This feature may be enabled and disabled under software control. In a fourth aspect of the invention, information from the instruction decoder is optionally used to override the correlation-based branch history table based prediction for select branch instructions. This feature may be enabled and disabled under software or hardware control.

3 Claims, 14 Drawing Sheets

OTHER PUBLICATIONS

C. O. Stjernfeldt, E. W. Czeck, and D. R. Kaeli; "Survey of Branch Prediction Strategies"; Northeastern University technical report CE–TR–93–05; Jul. 28, 1993.

Shien–Tai Pan et al.; "Improving the Accuracy of Dynamic Branch Prediction using Branch Correlation"; ACM ASPLOS V Conference Proceedings; Jun. 1992; pp. 76–84.

Shien–Tai Pan, Kimming So, and Joseph T. Rahmeh; "Correlation–Based Branch Prediction"; University of Texas at Austin technical report, UT–CERC–TR–JTR91–01; Aug. 1991.

T. Yeh and Y. N. Patt; "Alternative Implementations of Two–level Adaptive Branch Prediction"; Proceedings to the 19th Annual International Symposium on Computer Architecture; May 1992; pp. 124–134.

T. Yeh and Y. N. Patt; "A Comparison of Dynamic Branch Predictors that use Two Levels of Branch History"; Proceedings to the 20th Annual International Symposium on Computer Architecture; May 1993; pp. 257–266.

Anderson, Earle, Goldschmidt, Powers; "The IBM System/360 Model 91: Floating–Point Execution Unit"; Jan. 1967; The IBM Journal of Research and Development; pp. 34–53.

Anderson, Sparacio, Tomasulo; "The IBM System/360 Model 91: Machine Philosophy and Instruction–Handling"; Jan. 1967; The IBM Journal of Research and Development; pp. 8–24.

Bolan, Granito, Marcotte, Messina, Smith; "The IBM System/360 Model 91: Storage System"; Jan. 1967; The IBM Journal of Research and Development; pp. 54–58.

Flynn, Low; "The IBM System/360 Model 91: Some Remarks on System Development"; Jan. 1967; The IBM Journal of Research and Development; pp. 2–7.

Tomasulo; "An Efficient Algorithm for Exploiting Multiple Arithmetic Units"; Jan. 1967; The IBM Journal of Research and Development; pp. 25–33.

John Levine; "Why Programmers Hate the 8086 and 286" (Aug. 8, '90); Understanding x86 Microprocessors; ZD Press; 1993 Section 2; pp. 2–4 thru 2–9.

Lilja; "Reducing the Branch Penalty in Pipelined Processors"; IEEE; 1988; pp. 47–55.

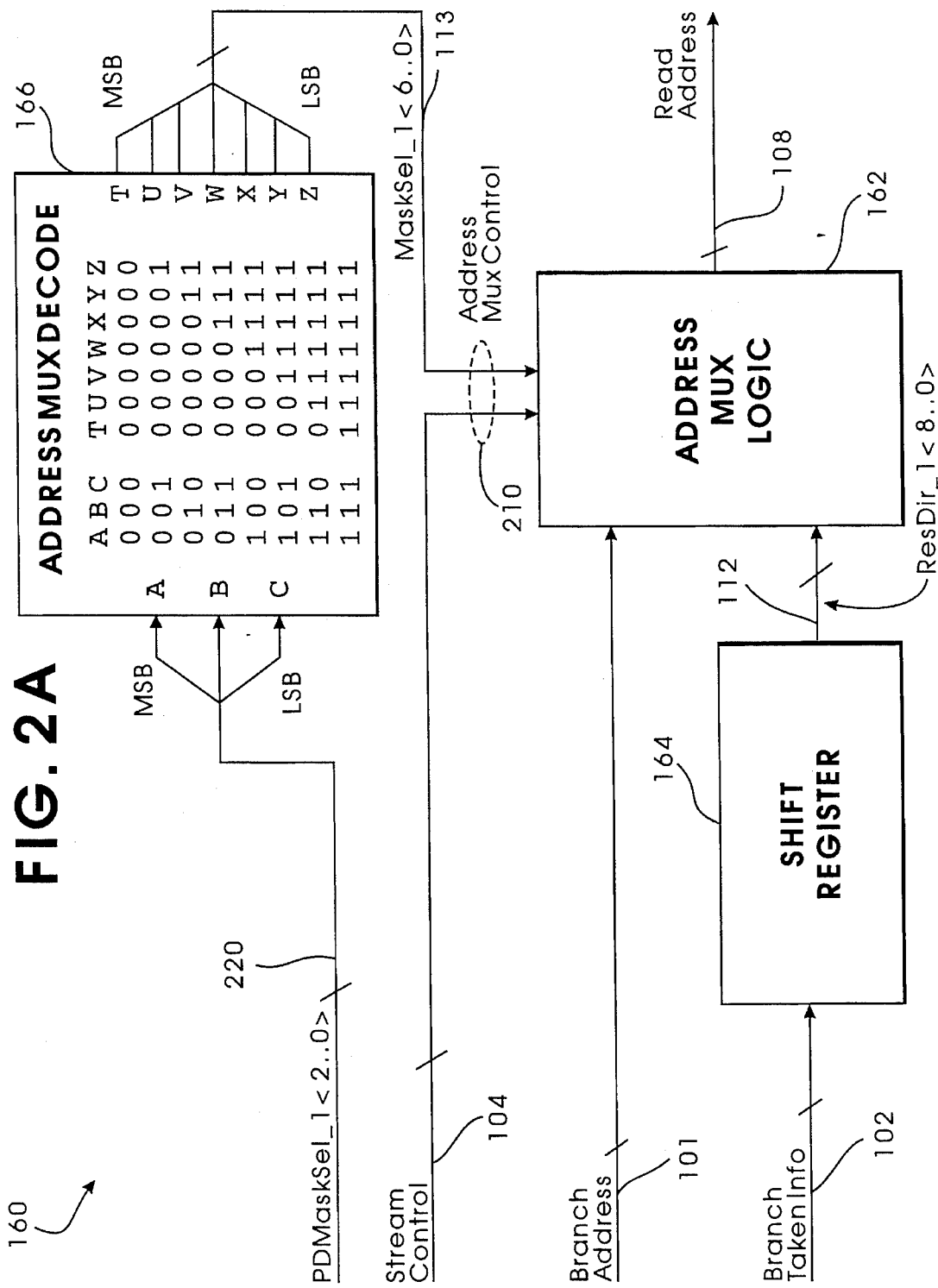

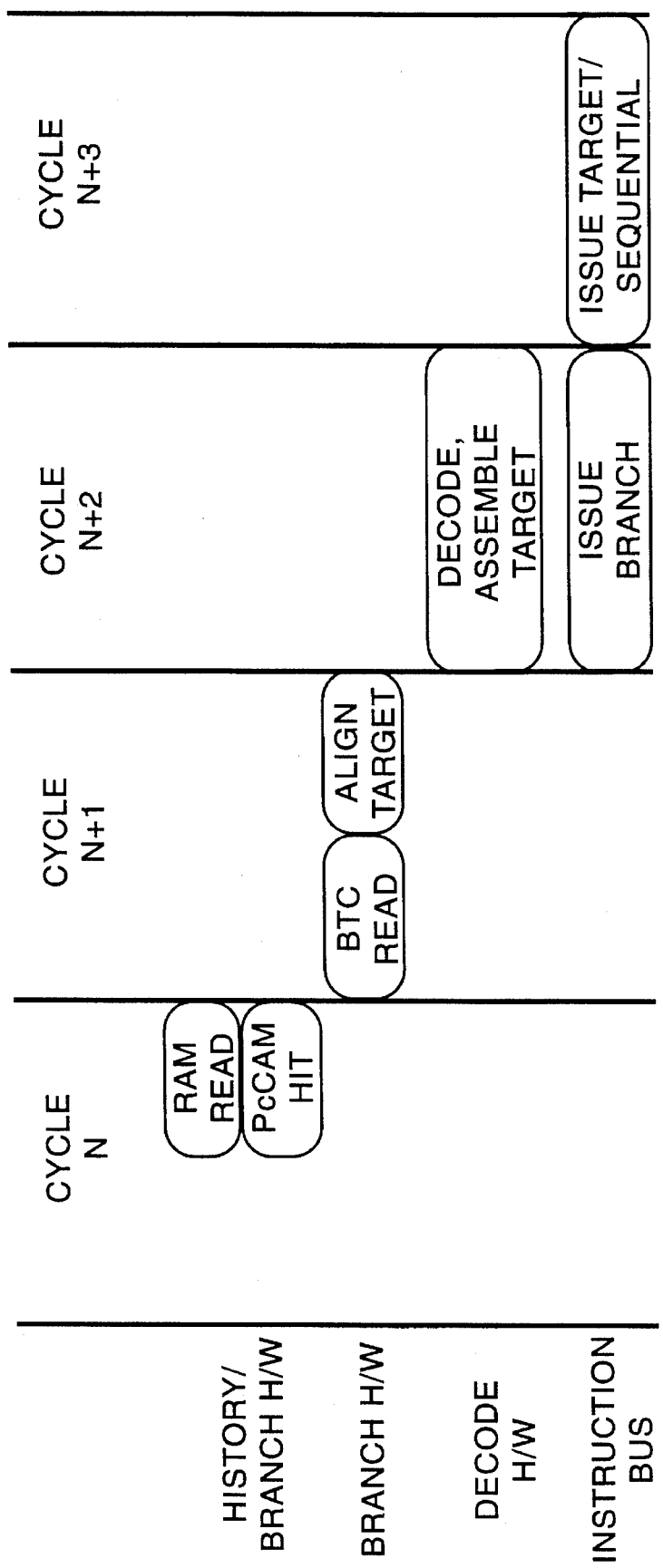

CONFIGURABLE BRANCH PREDICTION FOR A PROCESSOR PERFORMING SPECULATIVE EXECUTION

FIELD OF THE INVENTION

The invention relates to reducing pipeline delays in high performance processors by anticipating taken branches through branch prediction. More particularly, the invention relates to optimizing branch prediction accuracy through configurable branch prediction hardware. The invention further relates to the use of a branch prediction in a processor that performs speculative execution. The invention also relates to combining correlation-based branch prediction with information obtained from a conventional branch prediction cache or from knowledge of the type of branch gained from the instruction decoder.

BACKGROUND

Pipeline processors decompose the execution of instructions into multiple successive stages, such as fetch, decode, and execute. Each stage of execution is designed to perform its work within the processor's basic machine cycle. Hardware is dedicated to performing the work defined by each stage. As the number of stages is increased, while keeping the work done by the instruction constant, the processor is said to be more heavily pipelined. Each instruction progresses from stage to stage, ideally with another instruction progressing in lockstep only one stage behind. Thus, there can be as many instructions in execution, as there are pipeline stages.

The major attribute of a pipelined processor is that a throughput of one instruction per cycle can be obtained, though when viewed in isolation, each instruction requires as many cycles to perform as there are pipeline stages. Pipelining is viewed as an architectural technique for improving performance over what can be achieved via process or circuit design improvements.

The increased throughput promised by the pipeline technique is easily achieved for sequential control flow. Unfortunately, programs experience changes in control flow as frequently as one out of every three executed instructions. Taken branch instructions are a principal cause of changes in control flow. Taken branches include both conditional branches that are ultimately decided as taken and unconditional branches. Taken branches are not recognized as such until the later stages of the pipeline. If the change in control flow were not anticipated, there would be instructions already in the earlier pipeline stages, which due to the change in control flow, would not be the correct instructions to execute. These undesired instructions must be cleared from each stage. In keeping with the pipeline metaphor, the instructions are said to be flushed from the pipeline.

The instructions to be first executed where control flow resumes following a taken branch are termed the branch target instructions (target instructions). The first of the target instructions is at the branch target address (target address). If the target instructions are not introduced into the pipeline until after the taken branch is recognized as such and the target address is calculated, there will be stages in the pipeline that are not doing any useful work. Since this absence of work propagates from stage to stage, the term pipeline bubble is used to describe this condition. The throughput of the processor suffers whenever such bubbles occur.

Branch Prediction Caches (BPCs), also known as Branch Target Buffers (BTBs), are designed to reduce the occurrence of pipeline bubbles by anticipating taken branches. BPCs store information about branches that have been previously encountered. An Associative Memory is provided in which an associatively addressed tag array holds the address (or closely related address) of recent branch instructions. The data fields associated with each tag entry may include information on the target address, the history of the branch (taken/not taken), and branch target instruction bytes. The history information may take the form of N-bits of state (N is typically 2), which allows an N-bit counter to be set up for each branch tracked by the BPC.

The fetch addresses used by the processor are coupled to the branch address tags. If a hit occurs, the instruction at the fetch address causing the hit is presumed to be a previously encountered branch. The history information is accessed and a prediction on the direction of the branch is made based on a predetermined algorithm. If the branch is predicted not taken, then the pipeline continues as usual for sequential control flow. If the branch is predicted taken, fetching is performed from the target address instead of the next sequential fetch address. If target instruction bytes were cached, then these bytes are retrieved directly from the BPC. Because of using a BPC, many changes in control flow are anticipated, such that the target instructions of taken branches contiguously follow such branches in the pipeline. When anticipated correctly, changes in control flow due to taken branches do not cause pipeline bubbles and the associated reduction in processor throughput. Such bubbles occur, only when branches are mispredicted.

Conventionally, instructions fetched from the predicted direction (either taken or not-taken) of a branch are not allowed to modify the state of the machine until the branch direction is resolved. Operations normally may only go on until time to write the results in a way that modifies the programmer visible state of the machine. If the branch is actually mispredicted, then the processor can flush the pipeline and begin anew in the correct direction, without any trace of having predicted the branch incorrectly. Further instruction issue must be suspended until the branch direction is resolved. A pipeline interlock is thus provided to handle this instruction dependency. Waiting for resolution of the actual branch direction is thus another source of pipeline bubbles.

It is possible to perform speculative execution (also known as conditional, or out-of-order execution) past predicted branches, if additional state is provided for backing up the machine state upon mispredicted branches. In machines performing speculative execution, branch prediction hardware must be designed to account for the possibility that a branch will be resolved as mispredicted. Branch prediction hardware is more complex as a result. Speculative execution beyond an unresolved branch can be done whether the branch is predicted taken or not-taken. An unresolved branch is a branch whose true taken or not-taken status has yet to be decided. Such branches are also known as outstanding branches.

Pipelining is extensively examined in "The Architecture of Pipelined Computers," by Peter M. Kogge (McGraw-Hill, 1981). A more recent treatment is provided by chapter 6 of "Computer Architecture, A Quantitative Approach," by J. L. Hennessy and D. A. Patterson (Morgan Kaufmann, 1990). Branch prediction and the use of a BTB are taught in section 6.7 of the Hennessy text. The Hennessy text chapter references provide pointers to several notable pipelined machines and for several contemporary papers on reducing branch delays. D. R. Ditzel and H. R. McLellan, "Branch folding in the CRISP microprocessor: Reducing the branch delay to zero," Proceedings of the 14th Symposium on Computer Architecture, June 1987, Pittsburgh, pg. 2–7, provides a short historical overview of hardware branch prediction. J. K. F. Lee and A. J. Smith, "Branch Prediction Strategies and Branch Target Buffer Design," IEEE Computer, Vol. 17, January 1984, pg. 6–22, provides a thorough introduction to branch prediction. Two recent excellent reports include "Branch Strategy Taxonomy and Performance Models," by Harvey G. Cragon (IEEE Computer Society Press, 1992) and "Survey of Branch Prediction Strategies," by C. O. Stjernfeldt, E. W. Czeck, and D. R. Kaeli (Northeastern University technical report CE-TR-93-05, Jul. 28, 1993).

The principles of out-of-order execution are also well known in the art. As background, out-of-order execution in the IBM System/360 Model 91 is discussed in section 6.6.2 of Kogge. The January 1967 issue of the IBM Journal of Research and Development was devoted to the Model 91. U.S. Pat. No. 5,226,126, ('126) PROCESSOR HAVING PLURALITY OF FUNCTIONAL UNITS FOR ORDERLY RETIRING OUTSTANDING OPERATIONS BASED UPON ITS ASSOCIATED TAGS, to McFarland et al., issued Jul. 6, 1993, which is assigned to the assignee of the present invention, describes speculative execution in the system in which the instant invention is used, and is hereby incorporated by reference.

U.S. Pat. No. 5,093,778, ('778) INTEGRATED SINGLE STRUCTURE BRANCH PREDICTION CACHE, to Favor et al., issued Mar. 3, 1992, which is assigned to the assignee of the present invention, teaches the implementation of the various components comprising a branch prediction cache as one integrated structure, and is hereby incorporated by reference. An integrated structure provides for reduced interconnect delays and lower die costs, due to smaller size. The '778 BPC was designed for use in a processor that uses out-of-order (speculative) execution.

"Improving the Accuracy of Dynamic Branch Prediction using Branch Correlation," by Shien-Tai Pan et al., ACM ASPLOS V Conference Proceedings, June 1992, pg. 76–84, teaches the use of correlation-based branch prediction tables. (This article appears to be an abridged version of "Correlation-Based Branch Prediction," Technical Report, UT-CERC-TR-JTR91-01, University of Texas at Austin, August, 1991.) Correlation-based branch prediction tables offer the promise of improved branch prediction accuracy for integer workloads. In correlation-based branch prediction tables, the address used to access the branch prediction table has two parts. One part is obtained from a portion (e.g., the least significant portion) of the branch address. A second part is obtained from a shift register that maintains the taken/not-taken history of the most recent branches.

The Pan et al. article reported simulation results for traces obtained from 3 floating-point and 4 integer SPEC benchmarks running on an IBM RISC System/6000. Comparison of a non-correlation counter-based BPT scheme was made against an 8-bit shift register for these benchmarks. Comparison of a non-correlation counter, a 5-bit shift register correlation scheme, and a 10-bit shift register correlation scheme, over a large range of table entries, was made for one of the integer benchmarks. Finally, a non-correlation counter scheme was compared to a 15-bit shift register "degenerate" scheme, in which no branch address bits were used. It was concluded that increasing the table size above 2K entries was not particularly beneficial and that a shift register of 5 to 8-bits would offer the "best improvement in accuracy" over a non-correlation counter scheme.

Beyond the trace-driven simulation evaluation approach described in the article, Pan et al. does not teach how to select the fixed shift-register size for other processor architectures or other instruction mixes. The selection of the fixed shift-register size is thus a problem for designers wanting to use the Pan correlation-based BPT scheme in other processor architectures. The SPEC benchmarks may not typify a typical instruction mix on the design architecture. A representative mix may not be practical to obtain, or its evaluation may not be practical due to the design schedule. Also, substantially different instruction mixes may be run by different users of a processor, or at different times by the same user. The designers face the risk that the fixed value chosen may not work out well in production.

Pan et al. do not mention the use of branch correlation based branch prediction with a conventional branch prediction cache. Thus there is no teaching of whether there is any advantage to using both techniques in some combination.

Pan et al. do not mention the use of branch correlation based branch prediction with instruction decode information. Thus there is no teaching of whether there is any advantage to using information about the kind of branch combined with the branch history information.

Pan et al. do not mention the use of branch correlation based branch prediction with speculative execution. Thus there is no teaching of how a correlation based scheme should be adapted for use in a processor that performs speculative execution.

Stjernfeldt et al. mentions an article by T. Yeh and Y. N. Part, "Alternative Implementations of Two-level Adaptive Branch Prediction," Proceedings to the 19th Annual International Symposium on Computer Architecture, pages 124–134, May, 1992, and describes the correlation and the two-level adaptive techniques as being closely related. These two techniques are classified and compared within a broader collection of related branch prediction techniques in a second article by T. Yeh and Y. N. Part, "A Comparison of Dynamic Branch Predictors that use Two Levels of Branch History," Proceedings to the 20th Annual International Symposium on Computer Architecture, pages 257–266, May, 1993. The term "adaptive" in the Yeh et al. articles is synonymously used for "dynamic," and merely connotes that the taken or not-taken prediction for each branch is adapted according to various aspects of the past behavior of the executing program. The prediction is an output of the prediction algorithm as embodied in the prediction hardware. While the prediction adapts to the program behavior according to the prediction algorithm, the prediction hardware and algorithm themselves are invariant with program behavior. There is no teaching in the Yeh et al. articles or the Pan et al. article of reconfiguring the branch prediction hardware in dynamic response to program behavior or under software control.

The first Yeh et al. article also describes the use of opcode information to define sets of branch history information for purposes of addressing. Again, the prediction is an output of the prediction algorithm as embodied in the prediction hardware. While opcode information is used to address different sets of history information, the prediction hardware and algorithm themselves are invariant with instruction execution. There is no teaching in the Yeh et al. article of reconfiguring the branch prediction hardware in dynamic response to instruction decode information.

SUMMARY OF THE INVENTION

In a first aspect of the invention, branch prediction hardware, comprising logic and interconnect, is configurable via a control line to alter the manner in which the branch prediction is generated. The configuration can be done programmatically in software. Or, the configuration can be done by hardware in response to processor events. Such processor events include the loading of the CS register and changes in the instruction workload.

In a second aspect of the invention, the directions of a plurality of branches are predicted based partly on resolved branch history information. Tentative branch history information is then stored for each of the predicted branches. When a predicted branch is resolved, the resolved branch history information is updated based on the stored tentative branch history information for the branch most recently resolved. Additionally, the predictions may be partly based on preceding unresolved branch predictions if any are outstanding.

In a third aspect of the invention, Hit/Miss information from a Branch Prediction Cache (BPC) can optionally be used in formulating the next state value of an addressed two-bit counter stored in a correlation-based branch history table. Since a Miss in the BPC may indicate that this branch has not been encountered recently, whatever state currently exists can be optionally forced to a state that is based solely on whether the branch is resolved taken or not. This feature may be enabled and disabled under software control.

In a fourth aspect of the invention, information from the instruction decoder is optionally used to override the correlation-based branch history table based prediction for select branch instructions. This feature may be enabled and disabled under software or hardware control.

BRIEF DESCRIPTION OF DRAWINGS

FIGS. 2A 2B and 2C are block diagrams of the Read Address Generator that drives the Read Address of the history RAM. FIG. 2A illustrates software control of the Read Address. FIG. 2B illustrates modifying the composition of the Read Address as a result of a major program event. FIG. 2C illustrates modifying the composition of the Read Address as a result of changing the nature of the instruction mix.

FIG. 7A shows the logic that determines the state transitions. FIG. 7B shows the logic required to generate a signal used in FIG. 7A.

FIG. 9 is a System Timing Diagram for RAM reads.

FIG. 10A shows the case when a branch is mispredicted. FIG. 10B shows the case when a branch is correctly predicted.

DETAILED DESCRIPTION OF THE INVENTION

Figure 1:
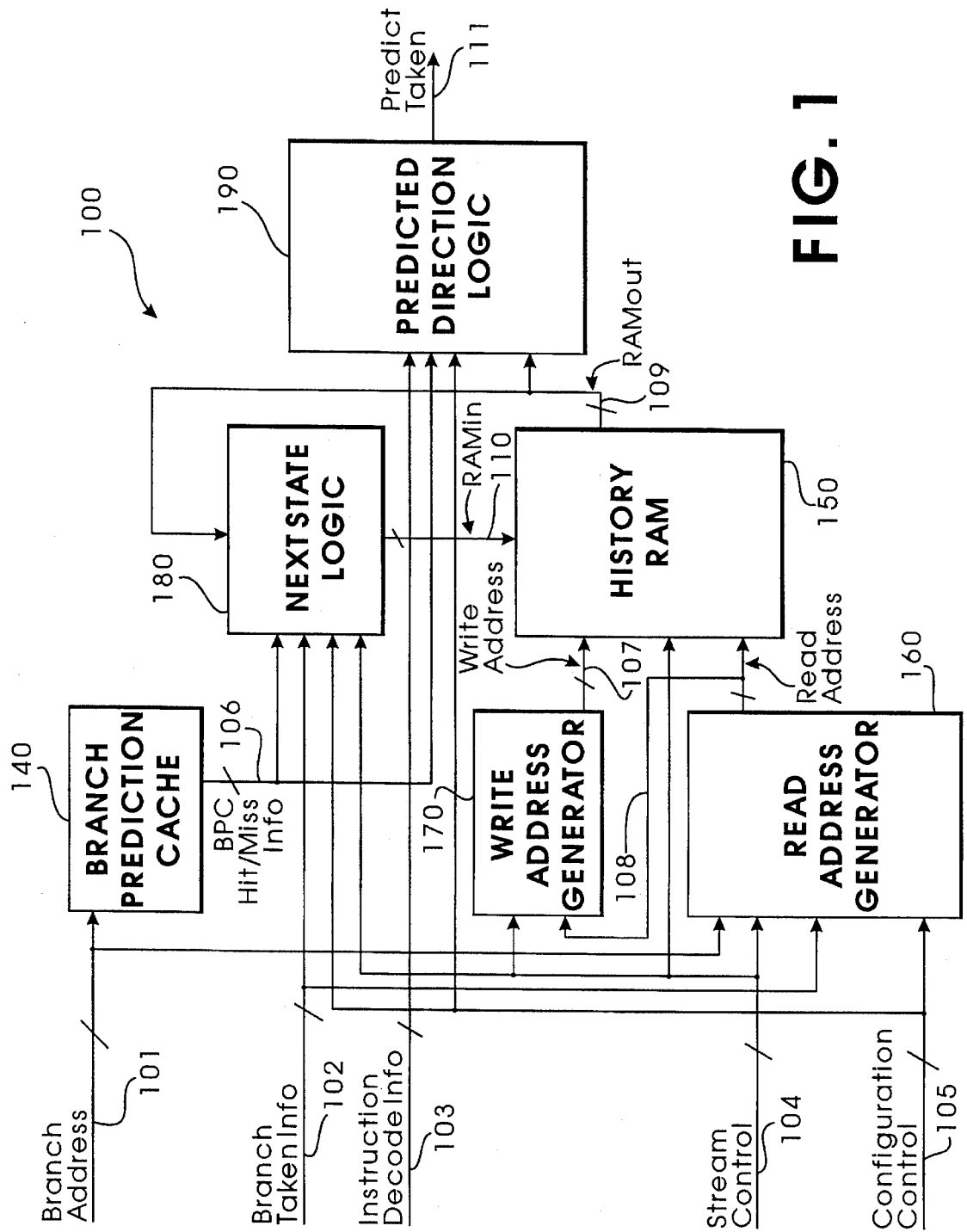
FIG. 1 an abstract block diagram showing the relationship of the history RAM to the branch prediction cache, the history RAM support logic, and the rest of the computer system.

FIG. 1 shows the major blocks that make up the Branch Prediction Logic 100 of the present invention. The classes of major signals that interconnect these blocks are also shown. Signals not directly pertinent to the instant invention, or best described via the other figures, are not shown in FIG. 1. The class signal names given here are descriptive and do not necessarily reflect the actual signal names used for the individual signals that make up a class. The relationship of these component signals to the class names will be made clear when each major block is examined in detail. An itemized list of the component signals in each class is provided near the end of the detailed description.

Lines marked with a short diagonal indicate multi-bit signals. Multi-bit signals are sometimes also indicated by a bit range suffix, comprising the most significant bit number, a double-period delimiter, and the least significant bit number, all enclosed in angle brackets (e.g., <9..0>). Multi-bit wide components are sometimes indicated by a bit size consisting of a number followed by a capital B (e.g., 13B). It is implied that when a single-bit width signal, such as a clock phase or an enable, is connected to a multi-bit wide component, the single-bit width signal is fanned out to the corresponding number of bits. Single bit taps on a multi-bit signal are drawn with the tap bit identified inside angle brackets. Multi-bit taps from or to a multi-bit signal are drawn with a label (e.g., 4 LSB) indicating the number of bits being tapped and their significance in the wider signal. When merging two or more signals into one, or demerging two or more signals from one, the significance order of the individual component signals within the combined signal is explicitly shown with MSB and LSB labels adjacent to the merge or demerge.

The design uses two-phase (phase 1 and phase 2) non-overlapping clocking. Most of the logic is implemented using transparent d-type latches, which have level-sensitive clock inputs. A latch clocked by phase 1 is called a phase 1 latch. Similarly, a phase 2 latch is one clocked by phase 2. Generally speaking, a latch of a given phase should be driven by a signal that is derived from a latch of the alternate phase. This design restriction greatly reduces the effort required to avoid race conditions. To facilitate the alternate phase rule, often a signal name is given a suffix that is descriptive of the "phaseness" of the signal. E.g., WE_1 is a signal output from a phase 1 latch.

Each branch can have both a dynamic prediction and a static prediction. The prediction (taken or not-taken) given by the two prediction types are in general not the same. Unless indicated otherwise, predictions should be presumed to be dynamic. Dynamic predictions are made at run-time. Static predictions are established prior to run-time. In the present embodiment, each branch opcode is assigned a static prediction. Thus every branch has a static prediction based solely on the branch's opcode. Unconditional branches have a static prediction of taken. Conditional branches have a static prediction of not-taken. While the conditional Loop instruction is nominally give a static prediction of not-taken, special control logic can force the branch prediction logic to treat the Loop instruction as though it had a static prediction of taken. This logic and the rational for its use is described in the section on the Predicted Direction Logic, infra.

A 16-Kbit (K=1024) RAM contained within block 150 is used as a correlation based branch history table. The RAM is provided with separate read and write addresses 108 and 107 from the Read Address Generator 160 and the Write Address Generator 170, respectively. Next State Logic 180 determines the value to be stored in the (write) addressed RAM entry. The RAM block output 109 is coupled to both the Next State Logic 180 and the Predicted Direction Logic 190. The RAM is written only for resolved branches that are conditional with a static prediction of not-taken. i.e., the RAM is written for all resolved branches except those that are statically predicted as taken.

The Branch Prediction Logic 100 is used in a processor performing speculative execution in as many as three instruction streams. This means there may be as many as two outstanding branches beyond which speculative execution may be performed. The RAM block output RAMout 109 includes two components: (1) the most recently looked up branch-prediction present-state-information, and (2) branch-prediction present-state-information associated with each of three streams. Stream Control signals 104 are required to manage these latter three per stream copies of branch prediction information.

The Read Address 108 is a combination of the Branch Address 101 and a stored history of Branch Taken Information 102. Whether the addresses used are physical or virtual is not critical to the invention. In the present embodiment a physical (real) address is used. The Branch Taken Information may include unresolved branch predictions as determined by the Stream Control signals 104. Several combinations of branch address and stored history are possible. The particular combination used is chosen by Configuration Control 105.

The Next State Logic 180 use RAMout 109 of the history RAM block 150 as present state information and produces the next state based on whether the branch in question is resolved taken or not-taken. Stream Control 104 is used to select which of the three per stream copies of present state (the second of the two components of signal 109, described supra) are to be used for generating the next state. Branch Taken Info 102 determines what state transitions are performed. The Next State Logic is optionally coupled, via BPC Hit/Miss Info 106, to a BPC 140 that is identical to that disclosed in the '778 patent, except that the 2-bit wide history bits array is no longer used, being replaced by the correlation based branch history table. Configuration Control 105 determines whether the BPC information is used or not.

The two-state predicted direction signal Predict Taken 111 indicates that the current branch is predicted taken (state=1) or not-taken (state=0). The predicted direction is generated by the Predicted Direction Logic 190 based on the most recently looked up present state information (the first of the two components of signal 109, described supra), Instruction Decode Information 103, and optionally the BPC Hit/Miss information 106. Configuration Control 105 determines whether the BPC information is used or not and the extent to which the Instruction Decode Information is used.

The Write Address Generator 170 saves selected copies of the Read Address 108 for each of the three instruction streams. It also selects which of the three copies is presented to the history RAM block 150. The saving and selection are determined by the Stream Control 104. The Read Address is saved for each issued branch. This saved address is used as a write address when the corresponding branch is resolved. Recall, that the RAM is written only for resolved branches that are conditional with a static prediction of not-taken.

READ ADDRESS GENERATOR

Figure 2B:
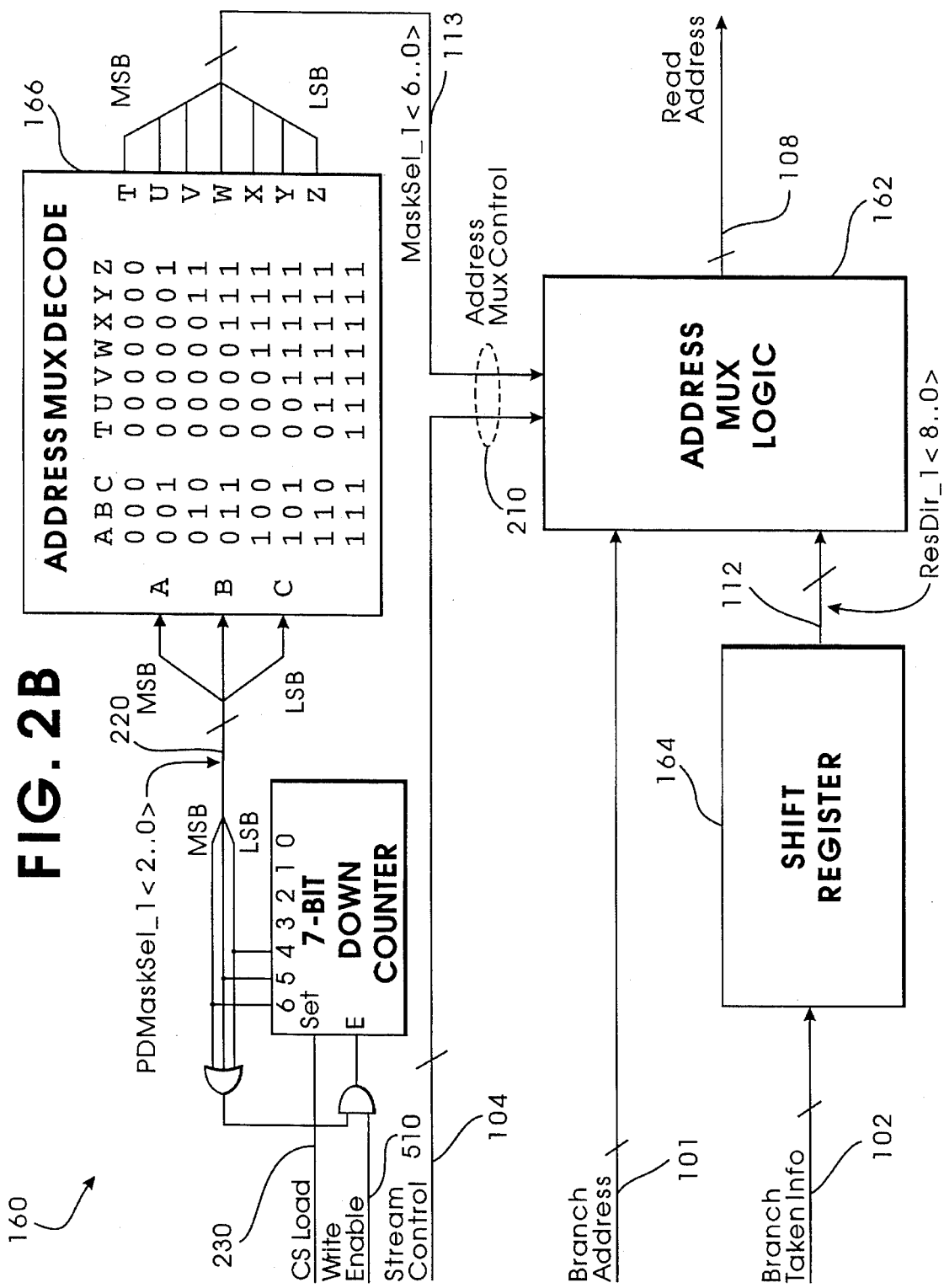
Figure 2C:
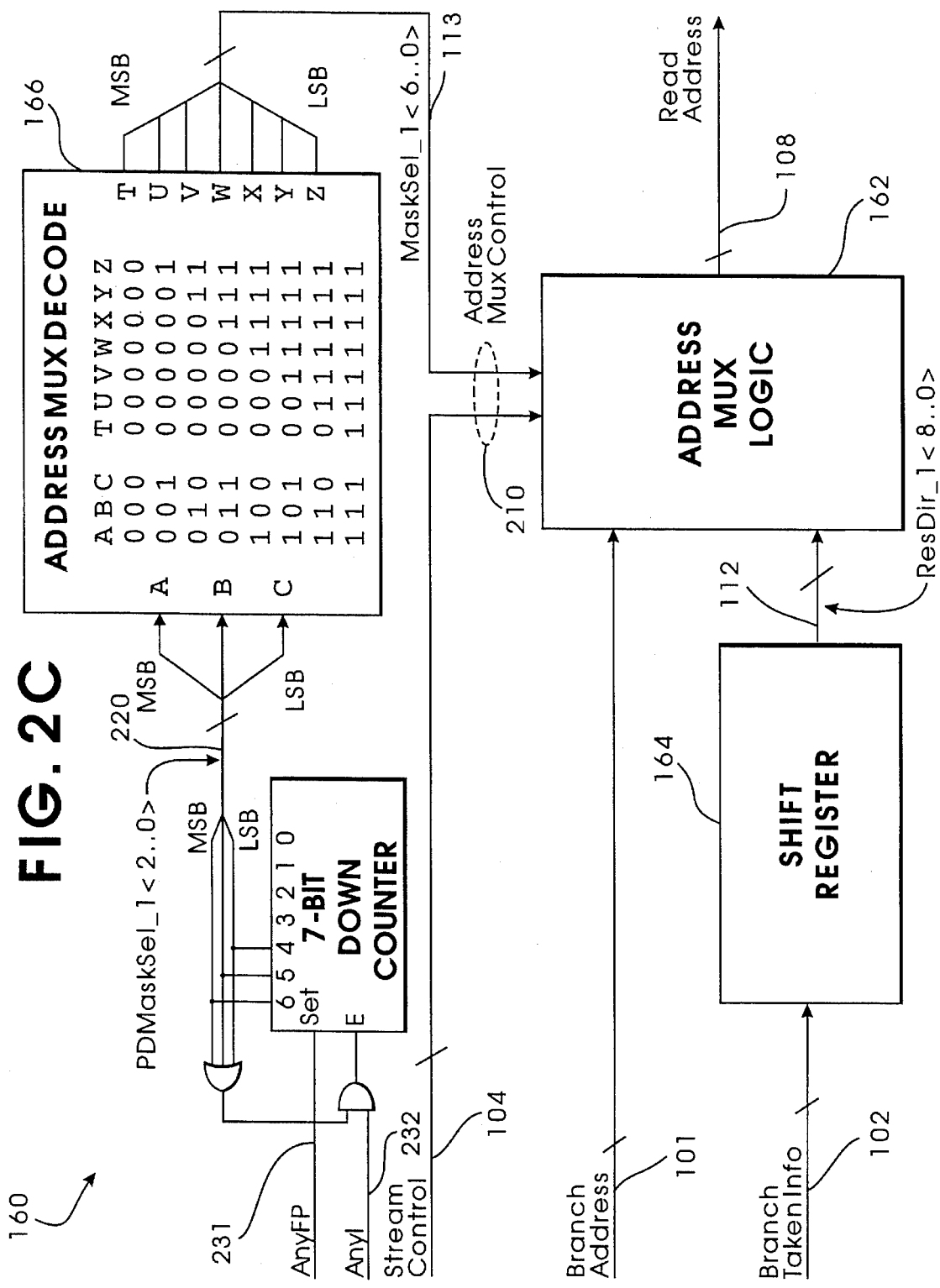

FIG. 2A shows the major components associated with the Read Address Generator 160. The Read Address 108 is a combination of the Branch Address 101 and the parallel output ResDir_1<8..0> 112 of a Shift Register 164. The Shift Register stores Branch Taken Info 102. The exact nature of the Branch Address and Shift Register combination is accomplished with Address Mux Logic 162. The Address Mux Logic is responsive to the Address Mux Control signals 210, comprising MaskSel_1<6..0> 113 and Stream Control 104. MaskSel_1<6..0> 113 is output from Address Mux Decode 166 based on PDMaskSel_1 <2..0> 220, a component of Configuration Control 105. FIGS. 2B and 2C will be discussed in conjunction with the Address Mux Control, infra.

SHIFT REGISTER

Figure 3:
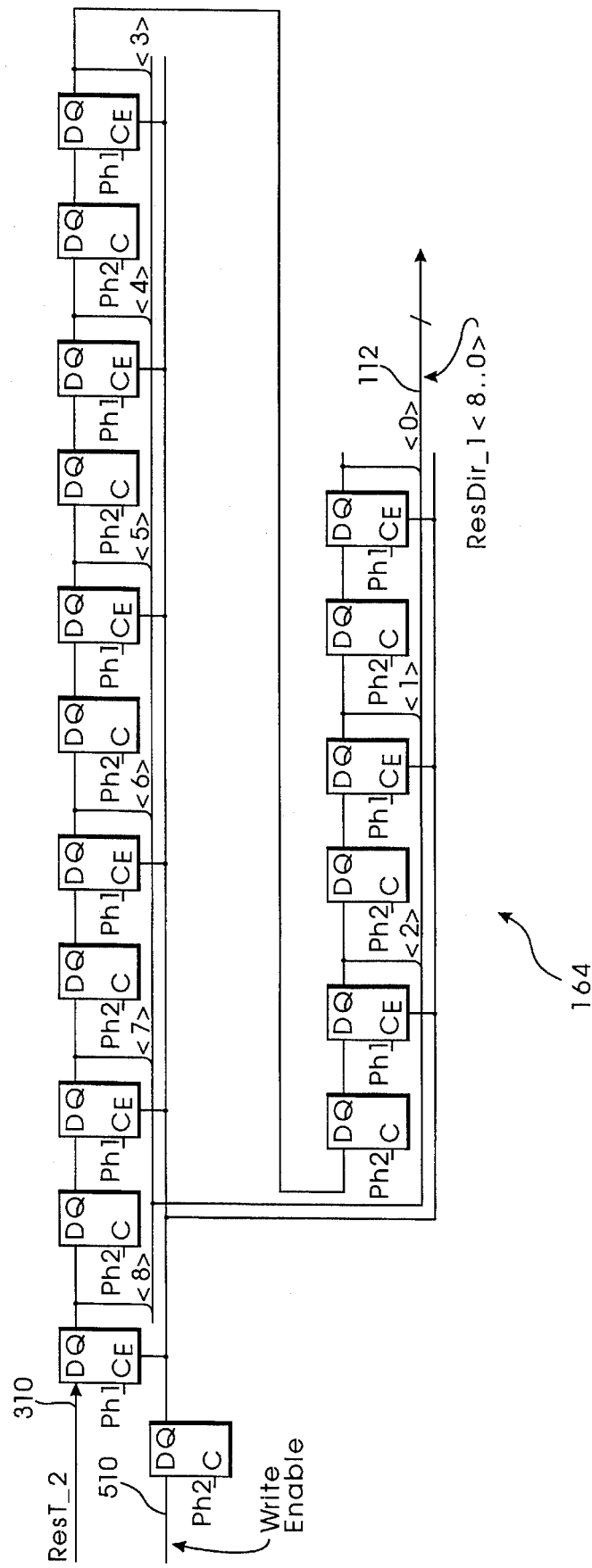
FIG. 3 is a schematic of the Shift Register used in the Read Address Generator.

FIG. 3 is a schematic of the Shift Register 164, formed from eight phase 2, phase 1, latch pairs, plus an additional phase 1 latch. The shift register is thus 9-bits long. Only the phase 1 latches are enabled. The input 310 to the Shift Register is the resolved branch direction, ResT_2, a component of Branch Taken Info 102. That is, if the branch is resolved taken, a one is input to the Shift Register. The Shift Register is enabled only when a statically predicted not taken branch is resolved. The output of the Shift Register is ResDir_1<8..0> 112. The most significant bit of 112 (ResDir_1<8>) is the most recent resolved branch direction. The least significant bit of 112 (ResDir_1 <0>) is the oldest resolved branch direction kept by the Shift Register. Write Enable signal 510 is active for resolved branches that are conditional and are statically predicted as not taken. This signal is also active when the branch history RAM is being initialized. A phase 2 version of signal 510 is used as the shift register enable. Write Enable 510 is generated by logic shown in FIG. 5. This logic is discussed in conjunction with the History RAM, infra.

ADDRESS MUX LOGIC

Figure 4:
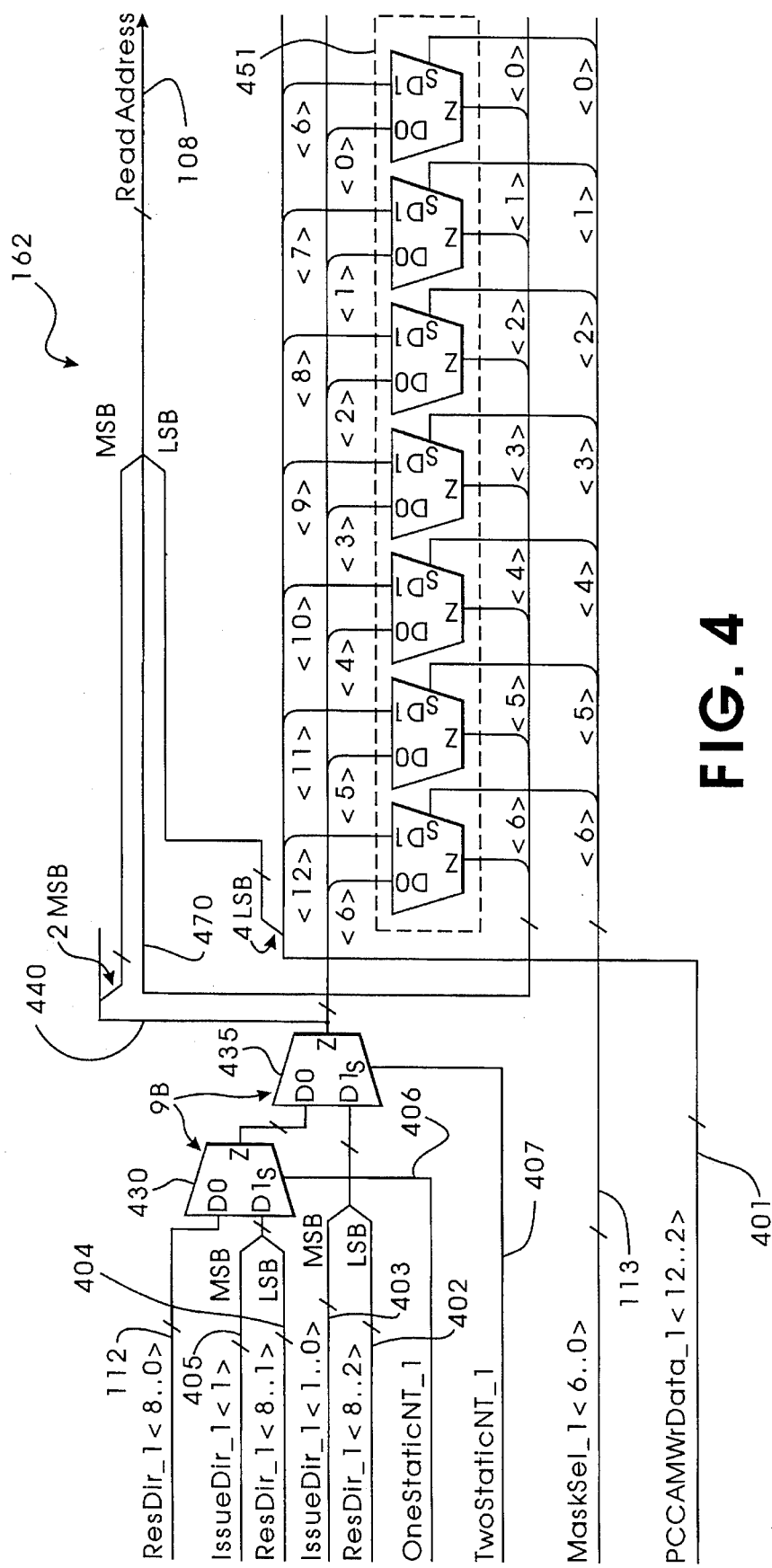
FIG. 4 is a schematic of the Address Mux Logic used in the Read Address Generator.

FIG. 4 is a schematic of the Address Mux Logic 162. PCCAMWRData_1<12..2> is brought in as signal 401, a component of the Branch Address 101 of FIG. 2A and 2B. MaskSel_1<6..0> determines the output of the seven muxes within the dashed box 451. The three configuration bits (PDMaskSel<2..0>) decoded by the Address Mux Decode 166 allow eight combinations of the control signals. These eight combinations are chosen to vary a predetermined field 470 of seven bits of the RAM Read Address 108. These seven bits can be varied from all seven bits being entirely from a seven-bit field of the Branch Address (PCCAMWr-Data_1<12..6>) to all seven bits being entirely based on the recent resolved static predicted not-taken branch direction 440. It is believed that older branch history information matters less than recent branch history information. Consequently, the combinations are defined such that the most significant bits of the nine-bit Shift Register field are given preferential selection over the less significant bits. That is, older branch history information is abandoned first, as the muxes are configured to use fewer bits from the Shift Register. Address Mux Decode 166 is a simple variation of a standard 3-to-8 decoder. The particular technology (i.e., gates, PLA, ROM, etc.) used to implement the combinational logic of this decoder is not critical to the invention. As shown in the truth table on the face of the Address Mux Decode, when PDMaskSel<2..0> is 111, MaskSel_1 <6..0> are all set. This corresponds to all seven bits being from the Branch Address. At the other extreme, when PDMaskSel<2..0> is 000, MaskSel_1 <6..0> are all clear. This corresponds to all seven bits being based on the branch direction information. The eight combinations form a progression, such that the number of bits contributed by each source can be changed in eight steps by one bit per step (combination).

The "logical" two most significant bits of the Shift Register 164 are fixed as the two most significant bits of the RAM Read Address 108. (See the discussion of speculative execution, infra, to understand the "logical" distinction.) The most significant Shift Register bits represent the most recent branch history. Since these two shift register bits are always used, the History RAM address always depends on the recent branch history to some extent.

The four least significant bits of the RAM Read Address 108 are fixed, using the four least significant bits (PCCAM-WRData_1<5..2>) of signal 401. The less significant Branch Address bits crudely represent the branch location in memory. The extent of branch aliasing due to ignoring the high order address bits is unknown and presumed negligible. Statistical data suggests that branches dynamically and statically occur approximately in one out of five instructions. Instructions are slightly more than two bytes long on average. It is therefore typically only necessary to resolve the branch location to within ten instructions. As a result it is not necessary to use the three least significant bits of the Branch Address. A slightly conservative choice of providing resolution to within four bytes was made and only the two least significant bits (PCCAMWRData_1<1..0>) are unused. It is believed that there is less branch aliasing due to this choice. Since these least significant branch address bits (PCCAM-WRData_1<5..2>) are always used, the History RAM address always depends on the branch location to some extent.

In summary, Read Address 108 consists of three sub-fields, listed in order from most significant to least significant as 1) the two most significant bits of Shift Register 164 (signal 440), 2) seven bits that are a configurable combination of the Shift Register and the Branch Address bits (signal 470), and 3) four less significant bits of the Branch Address (PCCAMWRData_1<5..2>). The particular division used here for the sub-fields and their ordering relative to each other, is not believed to be critical to the operation of the present invention. The bit width of Read Address 108 corresponds to the number of entries used for the history RAM. It is believed that branch prediction accuracy using the correlation based method is a strong function of the number of history RAM entries and a weak function of the choice and organization of address bits.

ADDRESS MUX CONTROL

At the system level of the present embodiment, the instant invention is used in a machine compatible with the industry standard PC architecture. A reserved BIOS function call accesses a special type of firmware called Hypercode. Hypercode resides in an address space not visible to the programmer. Reserved instructions and hardware functions exist which can only be directly used via Hypercode. A special Processor Configuration Register exists which is written via Hypercode. In a first embodiment (illustrated in FIG. 2A), there are three bits in the Processor Configuration Register allocated to history RAM address configuration. The three bits (PDMaskSel_1<2..0> 220 are a subset of the Configuration Control 105 shown routed to the Address Mux Decode 166. The bits are decoded into the MaskSel_1<6..0> 113, which is combined with Stream Control signals 104 to form Address Mux Control 210, which is coupled to the Address Mux Logic 162.

In a (prophetic) second embodiment (illustrated in FIG. 2B), the three history RAM address configuration bits (PDMaskSel<2..0>, signal 220) are the most significant three bits of a 7-bit down-counter. The counter is set, and ready to decrement, whenever CS Load signal 230 indicates that an instruction which loads the Code Segment Register has been executed. CS Load 230 is generated by the processor's instruction decode logic. The down-counter is enabled using the same Write Enable signal 510 as the Shift Register, until the three most significant bits are clear, at which point decrementing is disabled. Thus, following a change in code segment, the Read Address will depend mainly on branch location as opposed to branch history. As branches are resolved, the Read Address will slowly change to depend more on branch history and less on branch location. The rational for this approach is that the loading of CS is likely associated with such a significant change in location that the branch history information present in the Shift Register at the time of the load is no longer applicable to the executing code.

In a (prophetic) third embodiment (illustrated in FIG. 2C), the same circuitry as FIG. 2B is used, but with different control signals. Specifically, the counter is set whenever AnyFP 231 indicates that a floating-point instruction has been executed. The down-counter is enabled using AnyI 232, which indicates that an integer (non-floating-point) instruction has been executed. AnyFP 231 and AnyI 232 are generated by the processor's instruction decode logic. Thus, following any floating-point instruction, the Read Address will depend mainly on branch location as opposed to branch history. As integer instructions are executed in the absence of floating-point instructions, the Read Address will slowly change to depend more on branch history and less on branch location. The rational for this approach is that a Read Address based principally on the Branch Address is believed to offer the best branch prediction accuracy for scientific workloads, while a Read Address based principally on branch history is believed to offer the best accuracy for integer workloads.

In the embodiments illustrated by FIGS. 2B and 2C, it is believed likely that each time the Read Address definition is changed, the contents of the history RAM are effectively corrupted. Thus, there will be a transient period, associated with a decrease in branch prediction accuracy, while the history RAM's data is reestablished with the new Read Address definition. It is believed that the increased branch prediction accuracy achievable with the new configuration is worth the brief interval of reduced accuracy. The speed at which the Read Address definition is changed is a function of the number of bits in the down counters. The 7-bit counters are merely illustrative. It is believed likely that most implementations will want to use a significantly larger number of bits to slow down the rate of change of the Read Address definition. The three most significant bits would still be used for the address configuration bits 220.

The dynamic configuration approaches shown in FIGS. 2B and 2C do not explicitly provide for speculative execution. As shown, false changes in the Read Address definition would result due to speculative execution of CS load instructions or floating-point instructions that were later aborted. Such false changes may be acceptable.

The embodiments of FIGS. 2B and 2C illustrate how the Read Address could be dynamically controlled via hardware in response to major program events or changing the nature of the instruction mix. Clearly a combination of the approaches shown could also be made. The particular implementations shown are merely illustrative and are not critical to the invention. Those skilled in the art will recognize that there are many ways to carry out such dynamic control.

SPECULATIVE EXECUTION LOGIC WITHIN THE ADDRESS MUX LOGIC

During speculative execution, it is necessary to use predicted branch direction information to supplement the Shift Register output. Muxes 430 and 435, shown in FIG. 4, do this. If speculative execution were not used, signal 440 would be identical with signal 112. Recall that signal 112 is the output of the Shift Register 164, the shifting of said Shift Register only being enabled for resolved statically predicted not-taken branches. Mux control signals OneStaticNT_1 406 and TwoStaticNT_1 407 are components of Stream Control 104. Mux control signals 406 and 407 select the recent resolved branch direction 440 from among three choices.

Choice 1: When there are no unresolved branches, signal 112 is routed to the output 440.

Choice 2: When there is one unresolved statically predicted not taken branch, IssueDir_1<1> 405 indicates the predicted branch direction for the one branch. This is concatenated with signal 404, the most significant eight bits of signal 112, and routed to output 440. IssueDir_1<1> thus becomes the "logical" most significant bit of the Shift Register from the perspective of mux group 451. If the direction is correctly predicted, this bit will be clocked into the Shift Register when the branch is resolved.

Choice 3: When there are two unresolved statically predicted not taken branches (because of yet another statically predicted not taken branch in the target bytes of the first statically predicted not taken branch), IssueDir_1<1..0> 403 comprises the predicted branch direction for two branches. This is concatenated with the most significant seven bits 402 of signal 112 and routed to output 440. In this case, IssueDir_1<1..0> become the "logical" most significant bits of the Shift Register. IssueDir _1<1..0> 403 and IssueDir _1<1> 405 are a components of Stream Control 104. IssueDir _1<1> 405 is of course the most significant bit of IssueDir_1<1..0> 403.

HISTORY RAM

Figure 5:
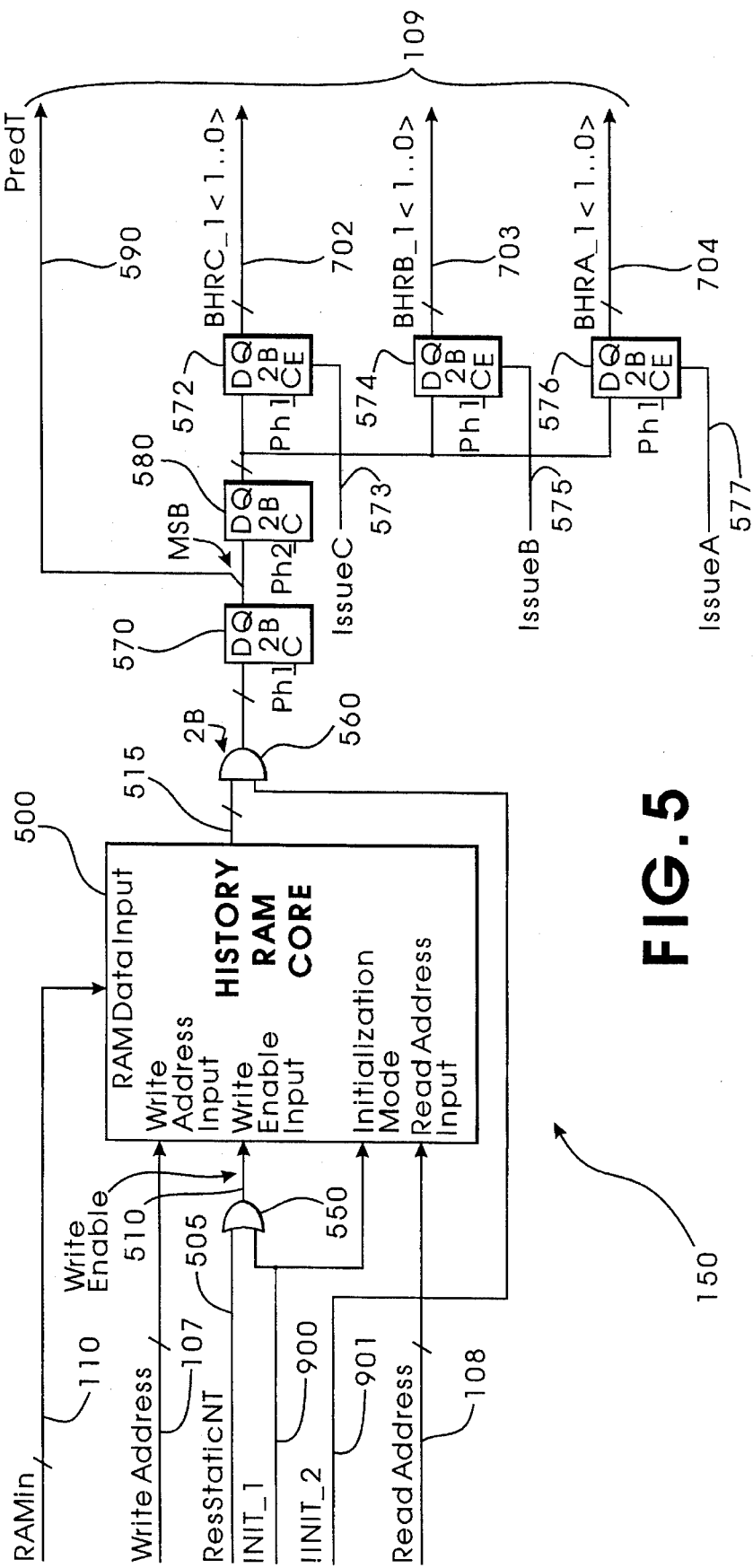
FIG. 5 is a schematic of the History RAM and its associated Write Enable logic.

FIG. 5 shows the History RAM block 150 comprising the History RAM Core 500, logic required by speculative execution, and write enable logic. The RAM Core has 8-K entries, each 2-bits wide. There are four states defined as Strongly Not-Taken (01), Weakly Not-Taken (00), Weakly Taken (10), and Strongly Taken (11). Note the transposition of the 00 and 01 states from what would be expected from a 2-bit up/down counter. The particular state assignment used is not critical to the invention and those skilled in the art will recognize that other assignments will work as well. The machine moves one state toward Strongly Taken for each branch resolved as actually taken, until it reaches the Strongly Taken state, where it remains. Similarly, the machine moves one state toward Strongly Not-Taken for each branch resolved as actually not-taken, until it reaches the Strongly Not-Taken state, where it remains. The states are defined so the most significant bit provides the predicted direction for the next occurrence of the branch. Separate Read Address 108 and Write Address 107 inputs and separate data in 110 (RAMin) and data out 515 ports are provided. This permits the RAM to be written to an independent address in the first half-cycle (phase 1) and read from one address in the second half-cycle (phase 2). A special initialization input is also provided to the RAM core.

ResStaticNT, signal 505, is active for resolved branches that are conditional and statically predicted as not taken. ResStaticNT 505 is a component of Stream Control 104. (Under certain circumstances, ResStaticNT will not be active for the Loop instruction. See the Loop discussion in the section on the Predicted Direction Logic, infra.) INIT_1 900 and !INIT_2 (Not-INIT_2) 901 are initialization signals that are functionally identical except for phase derivation and logical inversion. Write Enable 510 is the logical OR (using OR gate 550) of INIT_1 and ResStaticNT signal 505. The core output 515 is logically ANDed (using AND gate 560) with !INIT_2, and then latched by phase 1 latch 570. The most significant bit of the output of latch 570 is PredT, signal 590. Signal 590 is routed to the Predicted Direction Logic 190.

Latches 580, 572, 574, and 576 are required for speculative execution. Latch enables IssueC 573, IssueB 575, and IssueA 577, are components of Stream Control 104. When a branch issue activates a particular stream, the appropriate enable is activated. As a result, the present state branch history for up to three streams is maintained as signals BHRC_I <1..0>, BHRB_1<1..0>, and BHRA _1<1..0> (signals 702, 703, and 704, respectively). These three signals and the PredT signal are all components of output 109. Signals 702, 703, and 704 are routed to Next State Logic 180.

The RAM is initialized to all zeros. (See the discussion of the Write Address Generator, infra.) This corresponds to the Weakly Not-Taken state. Initialization is not necessary for the branch correlation function, as the RAM quickly adapts to reflect the behavior of the program executing. Simulation incompatibilities with respect to undefined states are avoided by initialization. Testability is also simplified by always starting from the same state. Initializing the RAM does this. AND gate 560 results in output PredT 590 being forced to zero during initialization. This is the weakly Not-Taken state. Thus, all conditional branches are dynamically predicted not-taken during initialization. (Under certain circumstances, the Loop instruction will be predicted taken. See the Loop discussion in the section on the Predicted Direction Logic, infra.) By insuring a well-defined prediction output from the Prediction Direction Logic 190, it is possible to do other initialization procedures in parallel with the History RAM initialization. The initialization input to the RAM core alters the internal RAM addressing such that 16 entries are simultaneously initialized for each entry addressed. This reduces the time required to initialize all RAM locations.

WRITE ADDRESS GENERATOR.

Figure 6:
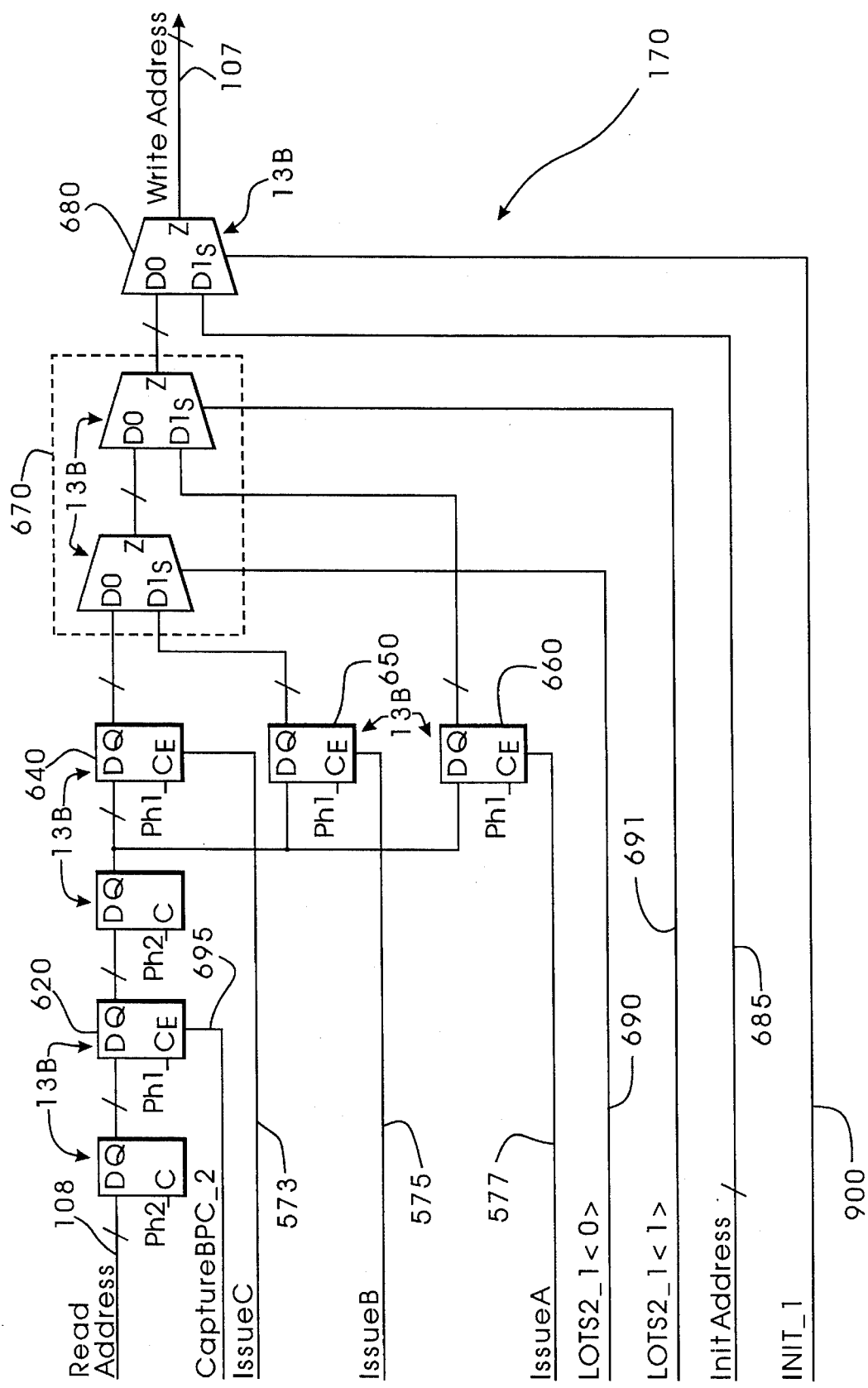
FIG. 6 is a schematic of the Write Address Generator that drives the Write Address of the history RAM.

FIG. 6 shows the Write Address Logic 170. The Read Address 108, used to read the history RAM 150, is saved on a per stream basis. Thus on a per stream basis, the Write Address Logic uses the same address as that used for the read address. Latch 620 is enabled by CaptureBPC_2 695. Signal 695 acts to save only those read addresses that follow a valid lookup as determined by the instruction issue and decode logic. CaptureBPC_2 695 is a component of Stream Control 104.

Latches 640, 650, and 660, as well as 3-to-1 Mux 670 are required for speculative execution. Signals 573, 575, 577, 690, and 691 are components of Stream Control 104. Signals IssueC 573, IssueB 575, and IssueA 577, enable the appropriate latch when a branch issue activates the corresponding stream. LOTS2_1<0>, signal 690, and LOTS2_1<1>, signal 691, act to select the stream that has just been resolved from among the three possibly outstanding streams. During normal operation, the stream selected by mux 670 is used as the Write Address 107.

INIT_1 signal 900 is the mux select for initialization mux 680. When signal 900 is active, the Write Address is forced to InitAddress, signal 685, which is an initialization address used to write the RAM during initialization.

NEXT STATE LOGIC

Figure 7A:
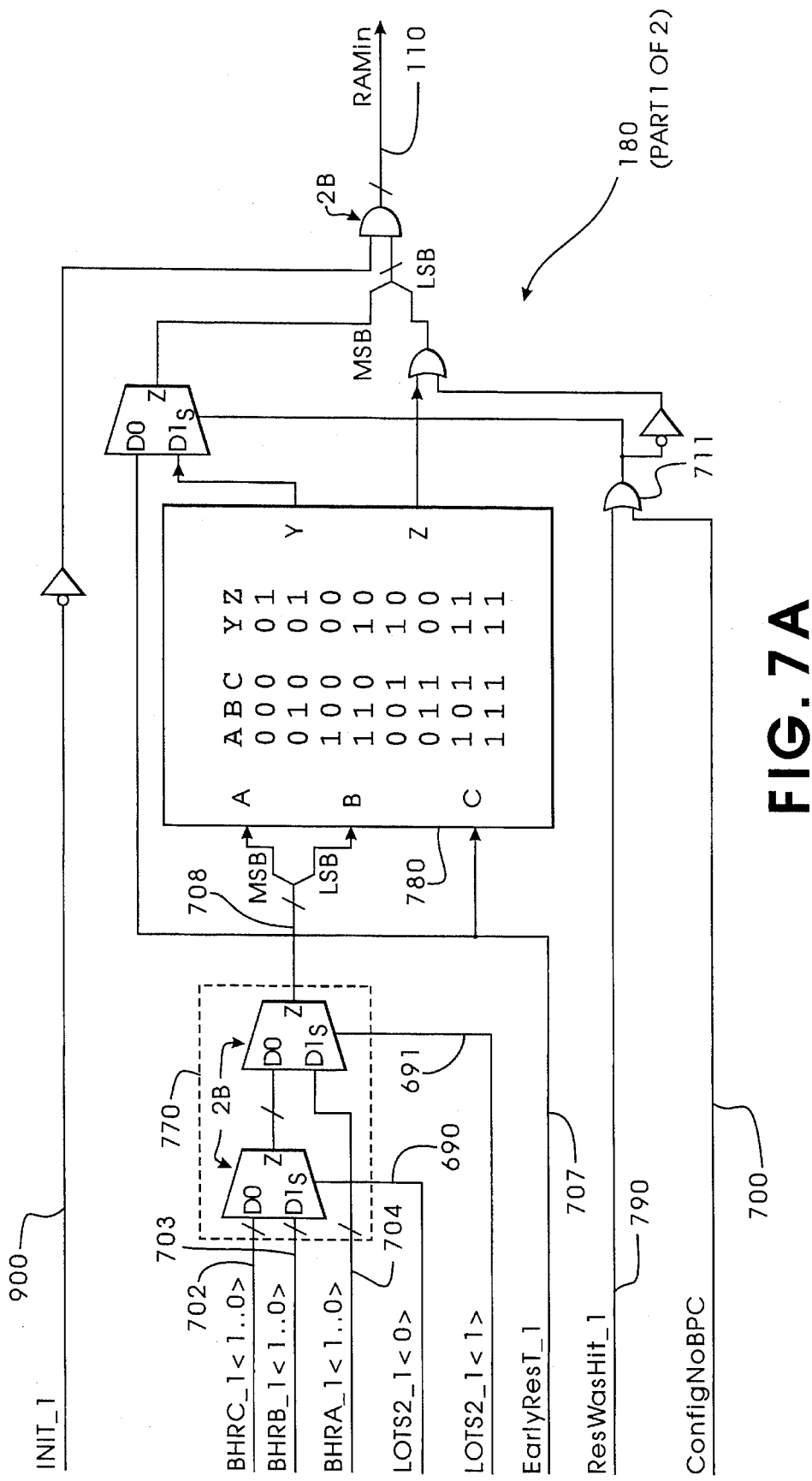
FIGS. 7A and 7B comprise a schematic of the Next State Logic that drives the data input on the history RAM.
Figure 7B:
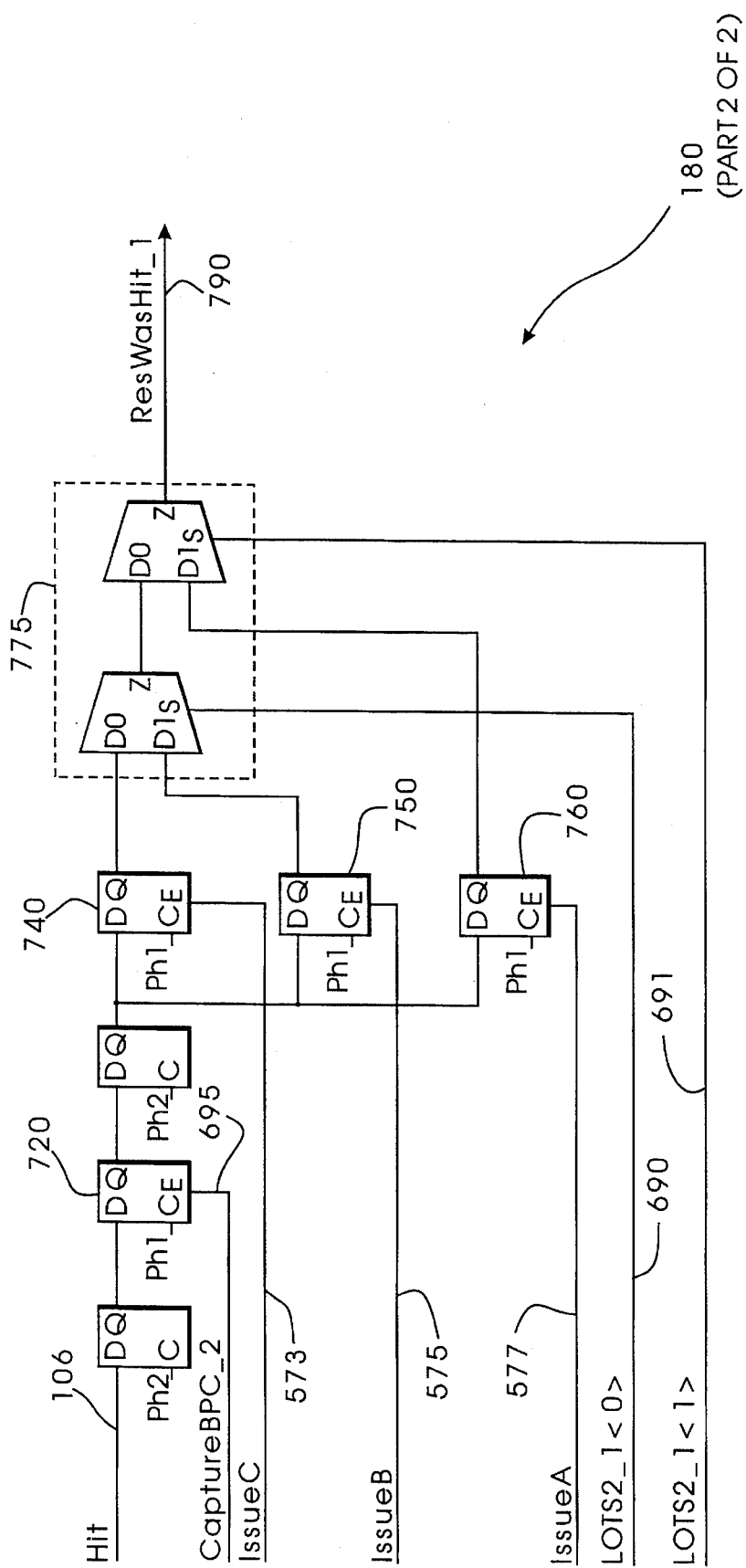

FIGS. 7A and 7B are a schematic of the Next State Logic 180. The Next State Logic 180 generates the next state values (RAMin) 110 to be written into the history RAM to implement a two-bit counter (four-state state machine). As mentioned previously, in this state machine, the states are 01 (Strongly Not-Taken), 00 (Weakly Not-Taken), 10 (Weakly Taken), and 11 (Strongly Taken). Transitions between states are decided in part by EarlyResT, signal 707, which shows whether the branch being resolved is actually taken (if one) or not-taken (if zero). EarlyResT 707 is a component of Branch Taken Info 102. The combinational logic which generates the next state values from the present state values is shown as block 780. The particular technology used to implement combinational logic 780 is not critical to the invention. The truth table on the face of block 780 specifies the block's behavior. Other branch predictor state machines, having different algorithms and different numbers of states, could have been easily done instead. The two present state bits 708 that are input to the block 780 are selected from among the three sets, BHRC_1<1..0>, BHRB_1<1..0>, and BHRA_1<1..0> (signals 702, 703, and 704, respectively, and components of RAMout 109), that are stored for each of the three possibly outstanding streams. This selection is performed by signals LOTS2_1<0> 690 and LOTS2_1<1>, components of Stream Control 104. The set whose stream corresponds to the currently resolving branch is the set used as input to block 780. These muxes and control for performing this selection are required only to support speculative execution. INIT_1, signal 900, is inactive during normal operation and active during initialization. Initialization thus forces all entries in the RAM to the Weakly Not-Taken state (00).

The instant invention improves branch prediction accuracy over the correlation scheme taught by Pan et al., by optionally using the Hit/Miss information Hit 106 from the Branch Prediction Cache in formulating the next state. Speculative execution requires Hit 106 to be saved on a per stream basis. ResWasHit_1, signal 790, is the per stream copy of Hit for the stream just resolved. The use of the Hit/Miss information is controlled by ConfigNoBPC, signal 700, a component of Configuration Control 105, and OR gate 711.

When ConfigNoBPC 700 is inactive, ResWasHit_1 106 determines the behavior of the state machine. If ResWasHit_1 is one (there was a BPC Hit for the branch just resolved), the next state value (RAMin) is determined by the output of block 780 as previously described. If ResWasHit_1 is zero, the result depends entirely on EarlyResT_1. Specifically, the next state will be Strongly Taken (11), if EarlyResT_1 is one (the branch was resolved taken). The next state will be Strongly Not-Taken (01), if EarlyResT_1 is zero.

When ConfigNoBPC 700 is active, the Hit/Miss information is ignored, and the branch is treated as though there was always a hit in the BPC. Thus, the next state value (RAMin) is determined by the output of block 780 as previously described.

FIG. 7B shows the ResWasHit_1 generation logic. This logic is very much like that of the Write Address Generator 170, and its description parallels that given for the Write Address Generator. Hit 106 is saved on a per stream basis. Latch 720 is enabled by CaptureBPC_2 695. Signal 695 acts to save only those Hit indications that follow a valid lookup as determined by the instruction issue and decode logic.

Latches 740, 750, and 760, as well as 3-to-1 Mux 775 are required for speculative execution. Signals 573, 575, 577, 690, and 691 are components of Stream Control 104. Signals IssueC 573, IssueB 575, and IssueA 577, enable the appropriate latch when a branch issue activates the corresponding stream. LOTS2_1<0>, signal 690, and LOTS2_1<1>, signal 691, act to select the stream that has just been resolved from among the three possibly outstanding streams. The save Hit value selected by mux 775 is used as ResWasHit_1 790.

In review, the state machine behaves analogously to that taught in FIG. 1 of Pan et al., when the branch results in a Hit in the Branch Prediction Cache, or when the Hit/Miss information is ignored. Unlike Pan et al., when the Hit/Miss information is used and there is a Miss in the BPC with a resolved taken branch, the state machine is forced to the Strongly Taken state. If the Hit/Miss information is used and there is a Miss in the BPC but the branch is resolved not-taken, the state machine is forced to the Strongly Not-Taken state. Other choices for the forced state are also possible.

Since the BPC is managed in a pseudo-LRU fashion, the Hit/Miss information gives an indication of the likely validity of the present state of the state machine. Specifically, a Miss shows that this branch has not been encountered recently. On a Miss it is thus believed advantageous to override whatever state currently exists and force a state that is based solely on whether the branch is resolved taken or not. This is believed to be true whenever the number of BPC entries is comparable to the number of History RAM entries. When the number of BPC entries is relatively small compared to the History RAM, a miss in the BPC does not warrant ignoring the present state of the addressed branch history. It is presently envisioned that ConfigNoBPC 700 will be configured appropriately by HyperCode during initialization.

PREDICTED DIRECTION LOGIC

Figure 8:
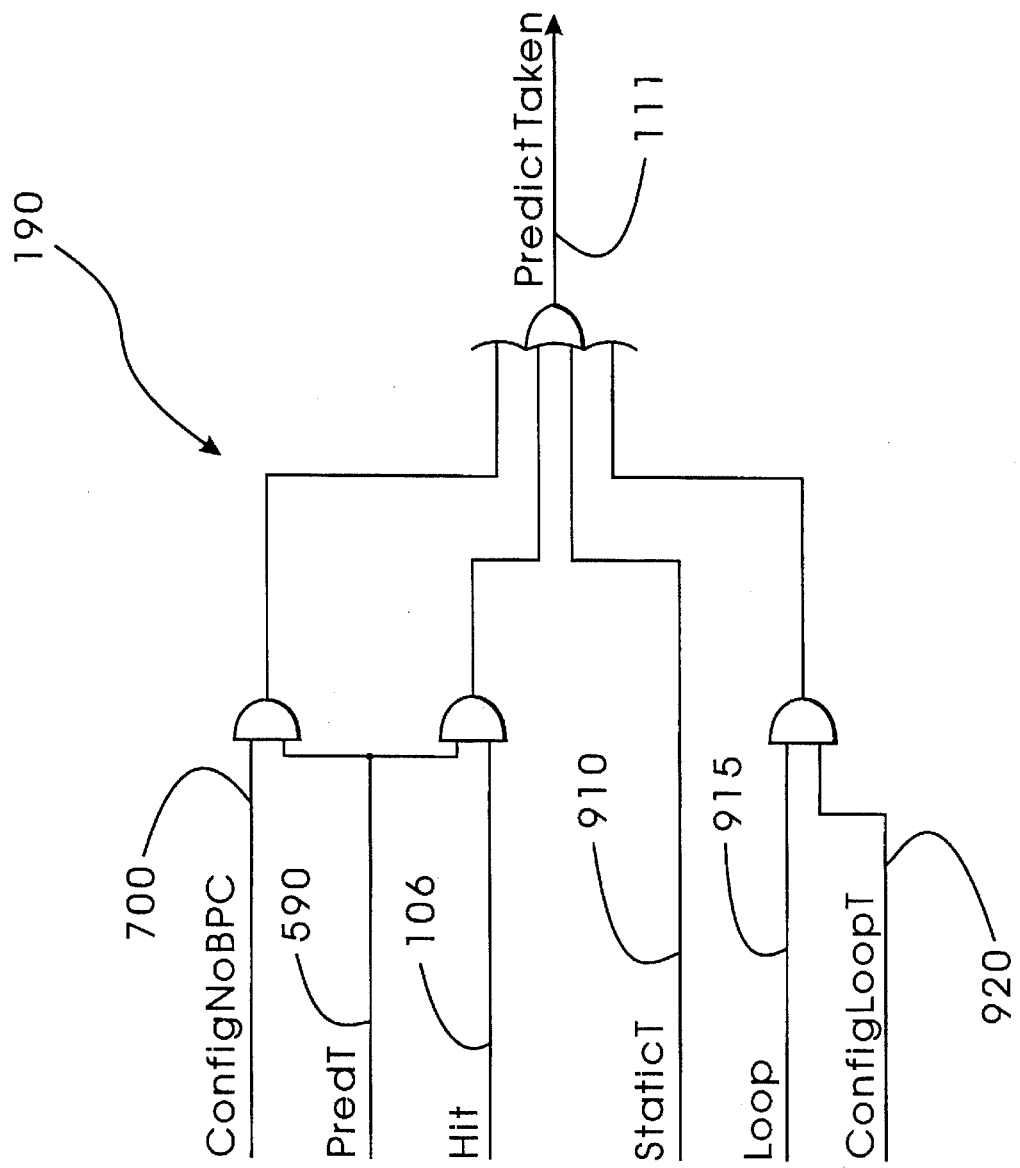
FIG. 8 is a schematic of the Predicted Direction Logic.

FIG. 8 is a schematic of Predicted Direction Logic 190. PredT, signal 590, gives an initial indication whether the branch should be predicted taken. PredT 590 is a component of RAMout 109. BPC Hit/Miss info (Hit) 106 is active when there has been a hit on the branch in the BPC. ConfigNoBPC 700, a component of Configuration Control 105, was introduced in conjunction with the Next State Logic 180. If either signal 106 or 700 is active, the predicted direction output Predict Taken 111 will be active whenever PredT 590 is active. Activating signal 700 thus effectively causes BPC Hit/Miss signal 106 to be ignored.

Signals StaticT 910 and Loop 915 are components of Instruction Decode Info 103. StaticT 910 is used to indicate unconditional transfer control instructions. Loop 915 indicates certain special case instructions that are conditional but are taken much more often than not. The Loop instruction is the prime example of the type of instruction indicated by signal 915. ConfigLoopT 920 is a component of Configuration Control 105. Activating ConfigLoopT 920 causes the special case instructions indicated by signal 915 to be always predicted taken. ResStaticNT 505 is designed not to be active for the instructions indicated by signal 915 (typically the Loop instruction) when signal 920 is active. Signal 920 may be dynamically controlled via Hypercode. One reason to activate signal 920 is to avoid mispredictions likely to occur during a transient period immediately following initialization. Since all locations in the history RAM are initialized to the Weakly Not-Taken state, it is likely that most Loop instructions would be otherwise mispredicted during this period.

SUMMARY OF COMPONENT SIGNALS IN EACH CLASS OF FIG. 1

Branch Address 101 includes 1 components: (1) PCCAM-WrData_1<12..2> 401 (FIG. 4).

Branch Taken Info 102 includes 2 components: (1) ResT_2 310 (FIG. 3) and (2) EarlyResT 707 (FIG. 7A).

Instruction Decode Info 103 includes 2 components: (1) StaticT 910 (FIG. 8) and (2) Loop 915 (FIG. 8).

Stream Control 104 includes 11 components: (1) OneStaticNT_1 406 (FIG. 4), (2) TwoStaticNT_1 407 (FIG. 4), (3) IssueDir_1<1..0> 403 (FIG. 4), (4) IssueDir_1<1> 405 (FIG. 4), (5) ResStaticNT 505 (FIG. 5), (6) CaptureBPC_2 695 (FIGS. 6 and 7B), (7) IssueC 573 (FIGS. 6 and 7B), (8) IssueB 575 (FIGS. 6 and 7B), (9) IssueA 577 (FIGS. 6 and 7B), (10) LOTS2_1<0> 690 (FIGS. 6 and 7B), and (11) LOTS2_1<1> 691 (FIGS. 6 and 7B).

Configuration Control 105 includes 3 components: (1) PDMaskSel_1<2..0> 220 (FIGS. 2A, 2B, and C), (2) ConfigNoBPC 700 (FIG. 7A), and (3) ConfigLoopT 920 (FIG. 8).

BPC Hit/Miss Info 106 includes 1 component: (1) Hit 106 (FIGS. 7B and 8).

PIPELINE TIMING

FIG. 9 shows the pipeline timing associated with reading the history RAM. A History RAM lookup in Cycle N, provides a direction prediction for a branch to be issued in Cycle N+2. If the branch is predicted taken, then an instruction, which is the target of the branch issued in N+2, may be issued in Cycle N+3. To issue such a branch target instruction using the minimum timing shown, requires both that the branch be in the PcCAM of the BPC and that the target instruction be in the Branch Target Cache (BTC) of the BPC. If the branch target instruction is in the BPC, there will be a hit on the Branch Address in cycle N. If the target instruction is in the BTC, it will be read during phase 1 of cycle N+1. The target is then aligned in phase 2 of Cycle N+1 and decoded and assembled in Cycle N+2. If the branch is predicted not-taken, then an instruction sequential to the branch may be issued in Cycle N+3. The minimum timing shown, presumes that the sequential instruction is already in a pre-fetch queue. The history RAM may be read in back-to-back cycles as required by instruction issue.

Figure 10A:
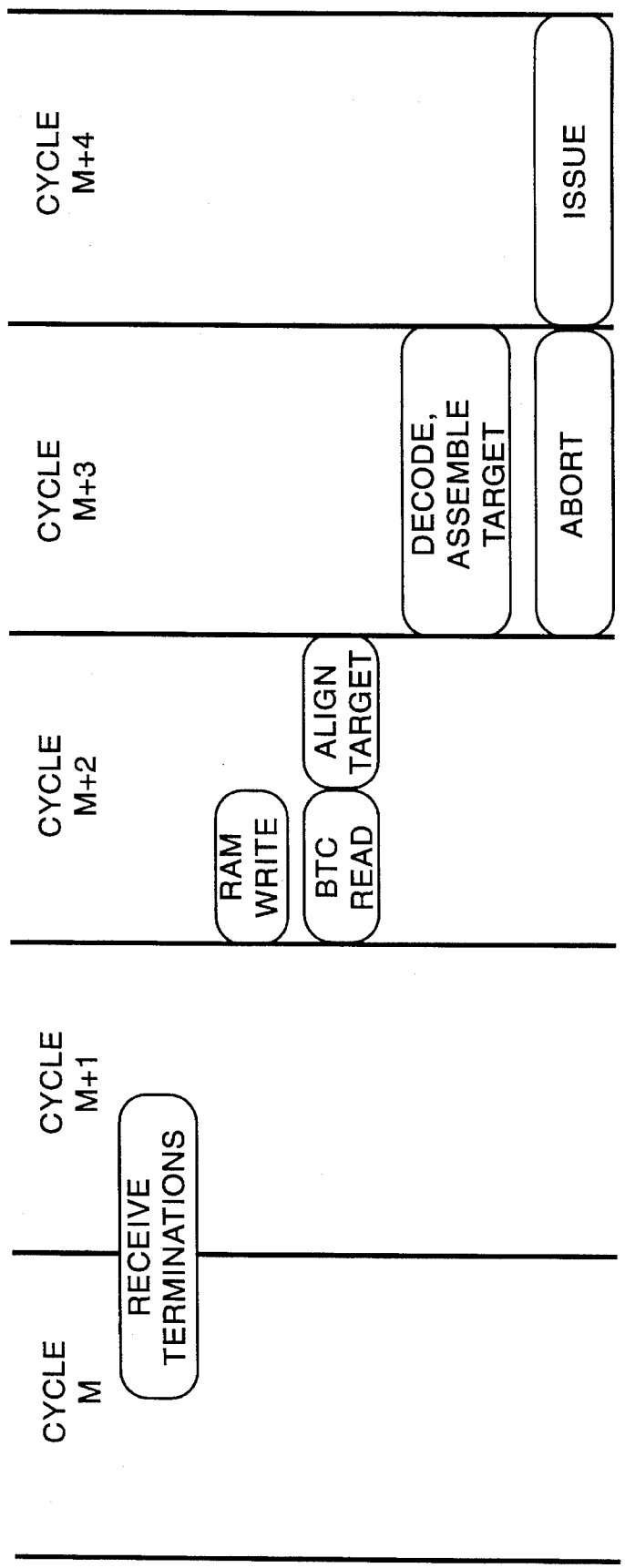
FIGS. 10A and 10B are System Timing Diagrams for RAM writes.
Figure 10B:
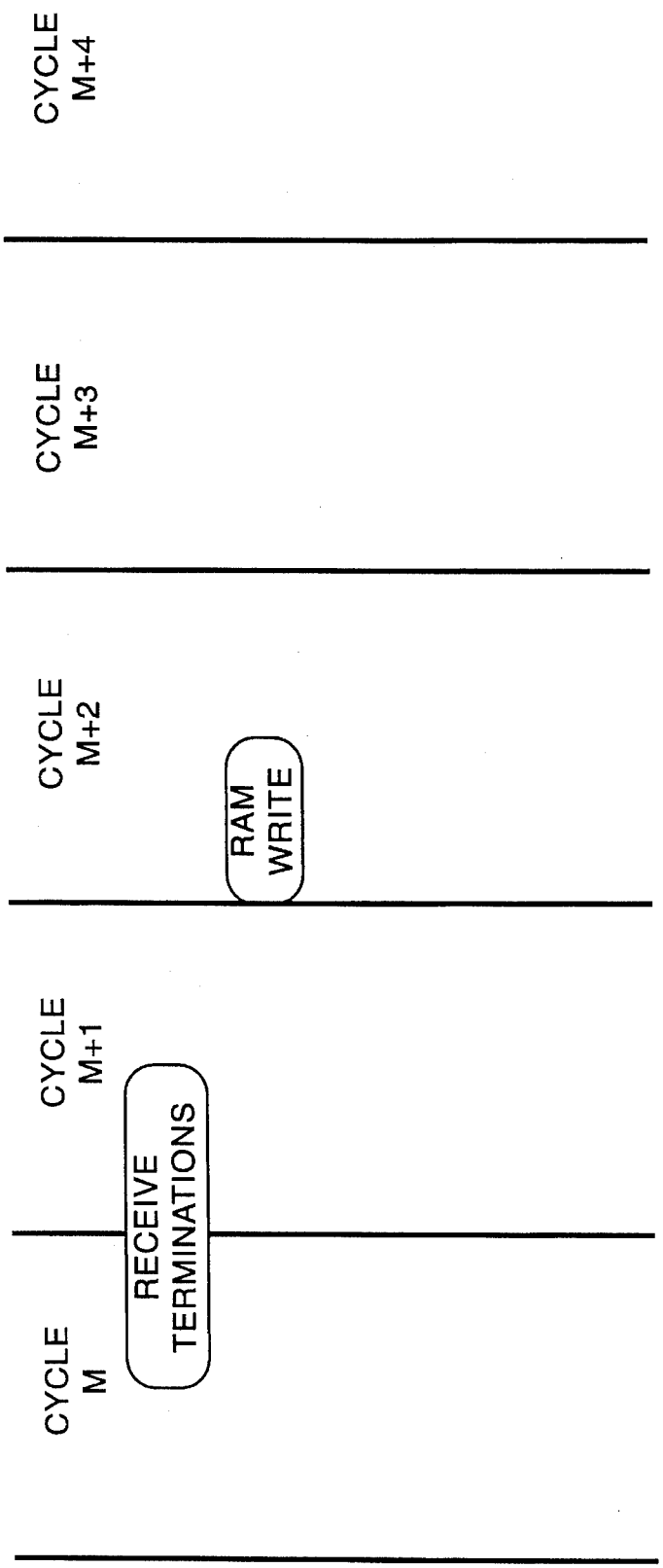

FIGS. 10A and 10B show the pipeline timing associated with writing the history RAM for two cases. FIG. 10A shows the case when the direction of the branch just resolved was mispredicted and the "correct" instruction bytes are read from the BPC and issued. FIG. 10B shows the case when the direction of the branch just resolved was correctly predicted. The RAM is written only after the distributed execution units have signaled terminations for the branch instruction, and the branch direction is resolved based on the terminations. The resolution is decided in Cycle M+1 and the RAM is written in the first half (phase 1) of the next cycle. Note that since the RAM is written after resolution, no extra shadow RAM is necessary to accommodate speculative execution. The history RAM may be written in back-to-back cycles as required by branch resolution.

Although the present invention has been described using a particular illustrative embodiment, it will be understood that many variations in construction, arrangement and use are possible within the scope of the invention. For example, the address muxes used to configure the Read Address might be carried out via a variety of technologies, including gates, pass-gates, or field programmable interconnect. RAM details, such as the number of RAM ports and the width of an entry, might be varied. Also, the number of streams involved in speculative execution may vary, or speculative execution may not be used at all. The present invention is thus to be considered as including all possible modifications and variations encompassed within the scope of the appended claims.

We claim:

1. A branch prediction mechanism for a processor performing speculative execution past branches, said branches having respectively associated taken and not-taken control flow paths, said branches having respectively associated instruction streams, said instruction streams corresponding to said taken control flow paths of said respectively associated branches, said branches being issued in original program order, said issued branches being respectively predicted to have either taken or not-taken behavior (direction), said taken or not-taken (taken/not-taken) behavior respectively corresponding to control flow behavior following said taken or not-taken control flow paths, a first dynamic group of said issued branches, said first dynamic group having unverified branch predictions, said first dynamic group being referred to as unresolved predicted branches, said unresolved predicted branches being equal in number to a first dynamic number, said first dynamic number being a number of said issued branches that have not been resolved, said first dynamic number being non-zero when at least one of said issued branches has an unverified branch prediction, each of said unresolved predicted branches having a unique relative age among said unresolved predicted branches, said unresolved predicted branches respectively becoming resolved branches in original program order as respective actual taken/not-taken behavior of each of said unresolved predicted branches is determined, each of said resolved branches having a unique relative age among said resolved branches, a second dynamic group of at least one of the youngest ones of said resolved branches being referred to as the most recently resolved branches, the youngest one of said most recently resolved branches being referred to as the most recently resolved branch, said speculative execution actively occurring from within a third dynamic group of at least one up to a predetermined plurality of said instruction streams, said third dynamic group being referred to as outstanding instruction streams, one of said instruction streams becoming one of said outstanding instruction streams upon an issue of the respectively associated branch of said one instruction stream, and said processor having branch-issued signals, said branch-issue signals dynamically identifying one of said outstanding instruction streams as being associated with a new issue of one of said branches, said branch prediction mechanism including:
- (A) a predetermined number of resolved branch direction history bits, the binary value of each of said resolved branch direction history bits representing the actual taken/not-taken behavior of one of said resolved branches, said resolved branch direction history bits being respectively maintained according to said original program order for said predetermined number of said most recently resolved branches;
- (B) valid speculative branch direction history bits equal in number to said first dynamic number of unresolved predicted branches, a binary value of each of said valid speculative branch direction history bits representing unverified predicted taken/not-taken behavior of one of said first dynamic number of unresolved predicted branches, said valid speculative branch direction history bits being respectively maintained according to said original program order for said first dynamic number of unresolved predicted branches;
- (C) a RAM that stores present state data for each of a plurality of branch history state machines, said RAM having a data output and a data input, said data input being for next state data, said branch history state machines having present-state-to-next-state transition behavior, said next state data becoming one of said present state data when said next state data is written into said RAM via said data input, said RAM being addressed by a combination of bits, said present state data at a location specified by said combination of bits being referred to as addressed present state data, said combination of bits comprising:
    - (a) a first part corresponding to bits from a branch address,
    - (b) a second part corresponding to said resolved branch direction history bits, and
    - (c) a third part corresponding to at least one of said valid speculative branch direction history bits;
- (D) a plurality of present state storage respectively associated with each of said plurality of outstanding instruction streams, said plurality of present state storage being coupled to the addressed present state data at said RAM's data output and having capture enable inputs coupled to said branch-issued signals, an enabled one of said plurality of present state storage corresponding to said outstanding instruction stream associated with said new issue of one of said branches, said RAM's addressed present state data being captured and held by said enabled present state storage; and
- (E) next state transition mapping logic, said logic mapping said present-state-to-next-state transition behavior for said branch history state machines, said logic generating said next state data based in part on the present state storage associated with said most recently resolved branch.

2. A branch prediction mechanism for a processor performing speculative execution past branches, said branches having respectively associated taken and not-taken control flow paths, said branches having respectively associated instruction streams, said instruction streams corresponding to said taken control flow paths of said respectively associated branches, said branches being issued in original program order, said issued branches being respectively predicted to have either taken or not-taken behavior (direction), said taken or not-taken (taken/not-taken) behavior respectively corresponding to control flow behavior following said taken or not-taken control flow paths, a first dynamic group of said issued branches, said first dynamic group having unverified branch predictions, said first dynamic group being referred to as unresolved predicted branches, said unresolved predicted branches being equal in number to a first dynamic number, said first dynamic number being a number of said issued branches that have not been resolved, said first dynamic number being non-zero when at least one of said issued branches has an unverified branch prediction, each of said unresolved predicted branches having a unique relative age among said unresolved predicted branches, said unresolved predicted branches respectively becoming resolved branches in original program order as respective actual taken/not-taken behavior of each of said unresolved predicted branches is determined, each of said resolved branches having a unique relative age among said resolved branches, a second dynamic group of at least one of the youngest ones of said resolved branches being referred to as the most recently resolved branches, the youngest one of said most recently resolved branches being referred to as the most recently resolved branch, said speculative execution actively occurring from within a third dynamic group of at least one up to a predetermined plurality of said instruction streams, said third dynamic group being referred to as outstanding instruction streams, one of said instruction streams becoming one of said outstanding instruction streams upon an issue of the respectively associated branch of said one instruction stream, and said processor having stream identification signals, said stream identification signals dynamically identifying one of said outstanding instruction streams as being associated with said most recently resolved branch, said branch prediction mechanism including:
- (A) a predetermined number of resolved branch direction history bits, the binary value of each of said resolved branch direction history bits representing the actual taken/not-taken behavior of one of said resolved branches, said resolved branch direction history bits being respectively maintained according to said original program order for said predetermined number of said most recently resolved branches;
- (B) valid speculative branch direction history bits equal in number to said first dynamic number of unresolved predicted branches, a binary value of each of said valid speculative branch direction history bits representing unverified predicted taken/not-taken behavior of one of said first dynamic number of unresolved predicted branches, said valid speculative branch direction history bits being respectively maintained according to said original program order for said first dynamic number of unresolved predicted branches;
- (C) a RAM that stores present state data for each of a plurality of branch history state machines, said RAM having a data output and a data input, said data input being for next state data, said branch history state machines having present-state-to-next-state transition behavior, said next state data becoming one of said present state data when said next state data is written into said RAM via said data input, said RAM being addressed by a combination of bits, said present data at a location specified by said combination of bits being referred to as addressed present state data, said combination of bits comprising:
(a) a first part corresponding to bits from a branch address,
(b) a second part corresponding to said resolved branch direction history bits, and
(c) a third part corresponding to at least one of said valid speculative branch direction history bits;
(D) a plurality of RAM read address storage respectively associated with each of said plurality of outstanding instruction streams; and
(E) RAM write address selection logic, said selection logic having an address output for providing a RAM write address, said selection logic having a plurality of selection address inputs respectively coupled to said plurality of RAM read address storage, said selection logic having a plurality of selection control inputs coupled to said stream identification signals, said selection logic coupling a selected one of said plurality of RAM read address storage to said address output in response to said selection control inputs, said selected RAM read address storage corresponding to said outstanding instruction stream associated with said most recently resolved branch.

3. A branch prediction mechanism for a processor performing speculative execution past branches, said branches having respectively associated taken and not-taken control flow paths, said branches having respectively associated instruction streams, said instruction streams corresponding to said taken control flow paths of said respectively associated branches, said branches being issued in original program order, said issued branches being respectively predicted to have either taken or not-taken behavior (direction), said taken or not-taken (taken/not-taken) behavior respectively corresponding to control flow behavior following said taken or not-taken control flow paths, a first dynamic group of said issued branches, said first dynamic group having unverified branch predictions, said first dynamic group being referred to as unresolved predicted branches, said unresolved predicted branches being equal in number to a first dynamic number, said first dynamic number being a number of said issued branches that have not been resolved, said first dynamic number being non-zero when at least one of said issued branches has an unverified branch prediction, each of said unresolved predicted branches having a unique relative age among said unresolved predicted branches, said unresolved predicted branches respectively becoming resolved branches in original program order as respective actual taken/not-taken behavior of each of said unresolved predicted branches is determined, each of said resolved branches having a unique relative age among said resolved branches, a second dynamic group of at least one of the youngest ones of said resolved branches being referred to as the most recently resolved branches, the youngest one of said most recently resolved branches being referred to as the most recently resolved branch, said speculative execution actively occurring from within a third dynamic group of at least one up to a predetermined plurality of said instruction streams, said third dynamic group being referred to as outstanding instruction streams, one of said instruction streams becoming one of said outstanding instruction streams upon an issue of the respectively associated branch of said one instruction stream, said processor having branch-issued signals, said branch-issue signals dynamically identifying one of said outstanding instruction streams as being associated with a new issue of one of said branches, and said processor having stream identification signals, said stream identification signals dynamically identifying one of said outstanding instruction streams as being associated with said most recently resolved branch, said branch prediction mechanism including:
(A) a predetermined number of resolved branch direction history bits, the binary value of each of said resolved branch direction history bits representing the actual taken/not-taken behavior of one of said resolved branches, said resolved branch direction history bits being respectively maintained according to said original program order for said predetermined number of said most recently resolved branches;
(B) valid speculative branch direction history bits equal in number to said first dynamic number of unresolved predicted branches, a binary value of each of said valid speculative branch direction history bits representing unverified predicted taken/not-taken behavior of one of said first dynamic number of unresolved predicted branches, said valid speculative branch direction history bits being respectively maintained according to said original program order for said first dynamic number of unresolved predicted branches;
(C) a RAM that stores present state data for each of a plurality of branch history state machines, said RAM having a data output and a data input, said data input being for next state data, said branch history state machines having present-state-to-next-state transition behavior, said next state data becoming one of said present state data when said next state data is written into said RAM via said data input, said RAM being addressed by a combination of bits, said present state data at a location specified by said combination of bits being referred to as addressed present state data, said combination of bits comprising:
(a) a first part corresponding to bits from a branch address,
(b) a second part corresponding to said resolved branch direction history bits, and
(c) a third part corresponding to at least one of said valid speculative branch direction history bits;
(D) a plurality of present state storage respectively associated with each of said plurality of outstanding instruction streams, said plurality of present state storage being coupled to the addressed present state data at said RAM's data output and having capture enable inputs coupled to said branch-issued signals, an enabled one of said plurality of present state storage corresponding to said outstanding instruction stream associated with said new issue of one of said branches, said RAM's addressed present state data being captured and held by said enabled present state storage; and
(E) next state transition mapping logic, said logic mapping said present-state-to-next-state transition behavior for said branch history state machines, said logic generating said next state data based in part on the present state storage associated with said most recently resolved branch;

(F) a plurality of RAM read address storage respectively associated with each of said plurality of outstanding instruction streams; and (G) RAM write address selection logic, said selection logic having an address output for providing a RAM write address, said selection logic having a plurality of selection address inputs respectively coupled to said plurality of RAM read address storage, said selection logic having a plurality of selection control inputs coupled to said stream identification signals, said selection logic coupling a selected one of said plurality of RAM read address storage to said address output in response to said selection control inputs, said selected RAM read address storage corresponding to said outstanding instruction stream associated with said most recently resolved branch.

* * * * *